(12) United States Patent
Flynn

(10) Patent No.: US 10,819,200 B2
(45) Date of Patent: Oct. 27, 2020

(54) MOTOR TOPOLOGY WITH EXCHANGEABLE COMPONENTS TO FORM DIFFERENT CLASSES OF MOTORS

(71) Applicant: QM Power, Inc., Kansas City, MO (US)

(72) Inventor: Charles J. Flynn, Greenwood, MO (US)

(73) Assignee: QM Power, Inc., Kansas City, MO (US)

( * ) Notice: Subject to any disclaimer, the term of this patent is extended or adjusted under 35 U.S.C. 154(b) by 24 days.

(21) Appl. No.: 16/372,024

(22) Filed: Apr. 1, 2019

(65) Prior Publication Data

US 2019/0334419 A1    Oct. 31, 2019

Related U.S. Application Data

(63) Continuation of application No. 14/962,616, filed on Dec. 8, 2015, now Pat. No. 10,250,111, which is a (Continued)

(51) Int. Cl.
| | |
|---|---|
| *H02K 16/00* | (2006.01) |
| *H02K 19/10* | (2006.01) |
| *H02K 1/17* | (2006.01) |
| *H02K 1/24* | (2006.01) |
| *H02K 1/27* | (2006.01) |
| *H02K 15/02* | (2006.01) |

(52) U.S. Cl.
CPC ............... *H02K 16/00* (2013.01); *H02K 1/17* (2013.01); *H02K 1/246* (2013.01); *H02K 1/27* (2013.01); *H02K 15/02* (2013.01); *H02K 19/103* (2013.01); *H02K 2213/12* (2013.01); *Y10T 29/49009* (2015.01); *Y10T 29/49012* (2015.01)

(58) Field of Classification Search
CPC ............ H02K 16/00; H02K 1/17; H02K 1/27; H02K 15/02
USPC ...................................................... 310/49.45
See application file for complete search history.

(56) References Cited

PUBLICATIONS

Electric Motor COntrol, Stephen Herman, 2009, 9th editiion (Year: 2009).*

* cited by examiner

*Primary Examiner* — Terrance L Kenerly
(74) *Attorney, Agent, or Firm* — Polsinelli PC

(57) ABSTRACT

Exchangeable stator components are selected and exchangeable rotor components are selected to transform a motor from one motor class to another motor class. A motor comprises three stator rings, three rotor rings, a first input, and a second input. The first input comprises two exchangeable stator components selected from a stator component group consisting of a stator spacer ring and an axially magnetized stator magnet ring. The second input comprises two exchangeable rotor components selected from a rotor component group consisting of a rotor spacer ring and an axially magnetized rotor magnet ring. The first input and the second input determine a motor class for the motor, the exchangeable stator components being exchangeable for different exchangeable stator components from the stator component group to manufacture another motor having a different motor class, the exchangeable rotor components being exchangeable for different exchangeable rotor components from the rotor component group to manufacture another motor having another different motor class.

20 Claims, 24 Drawing Sheets

Related U.S. Application Data continuation of application No. 13/466,077, filed on May 7, 2012, now Pat. No. 9,231,459.

(60) Provisional application No. 61/483,461, filed on May 6, 2011.

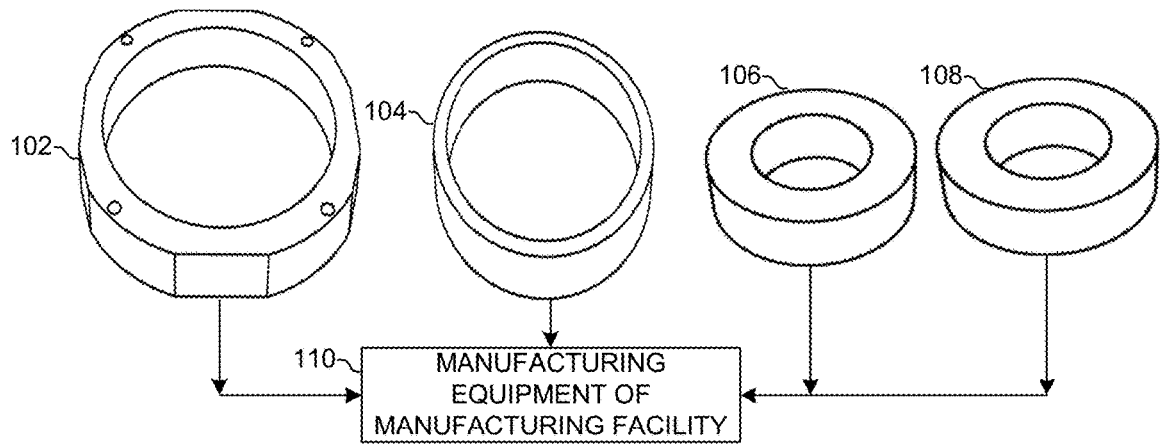
FIG. 1
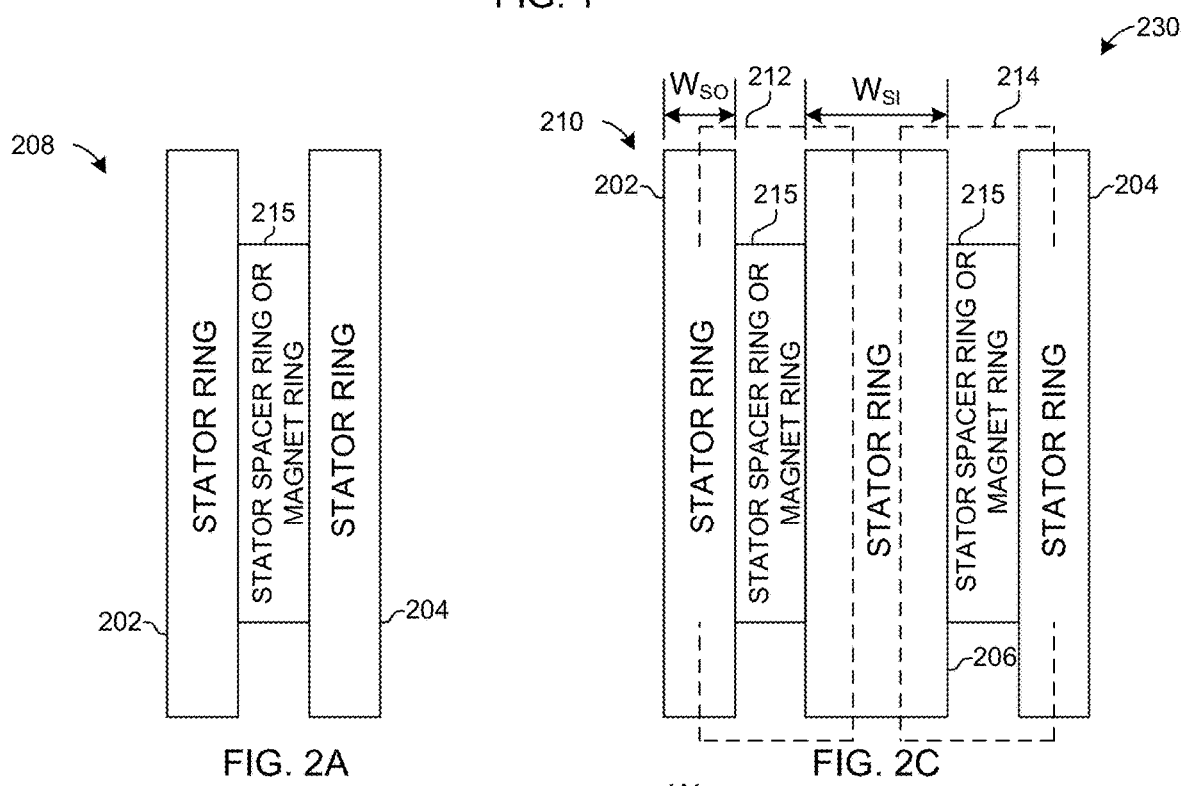
FIG. 2A
FIG. 2C
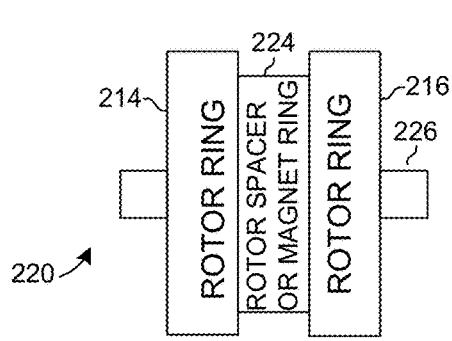
FIG. 2B
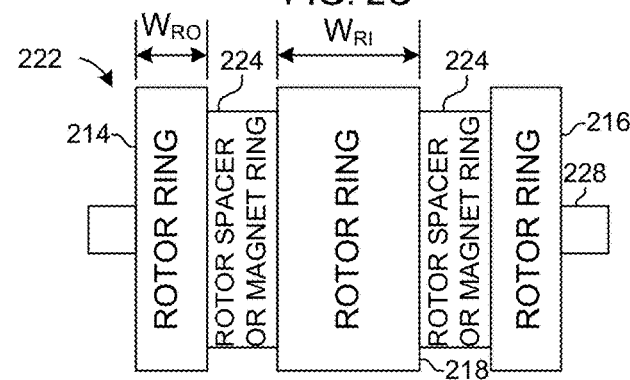
FIG. 2D

Front stator & rotor

Rear stator & rotor

CW @ Start Position Shown in Above Drawings

PH-2
PH-1
PH-4
PH-3

CCW @ Start Position Shown in Above Drawings

PH-2
PH-1
PH-3
PH-4

MOTOR TOPOLOGY WITH EXCHANGEABLE COMPONENTS TO FORM DIFFERENT CLASSES OF MOTORS

RELATED APPLICATIONS

This application is a continuation of U.S. application Ser. No. 14/962,616, filed Dec. 8, 2015, entitled Motor Topology with Exchangeable Components to Form Different Classes of Motors, which is a continuation of U.S. application Ser. No. 13/466,077, filed May 7, 2012, entitled Motor Topology with Exchangeable Components to Form Different Classes of Motors, which takes priority to U.S. Application No. 61/483,461, filed May 6, 2011, entitled Motor Topology with Exchangeable Components to Form Different Classes of Motors, the entire contents of which are incorporated fully herein by reference. This application fully incorporates herein the entire contents of U.S. Pat. No. 7,898,135, filed Mar. 7, 2008, entitled Hybrid Permanent Magnet Motor; U.S. Publication No. 2008/0272664, filed Mar. 27, 2008, entitled Permanent Magnet Electro-Mechanical Device Providing Motor/Generator Functions; U.S. Publication No. 2011/0089775, filed Oct. 19, 2010, entitled Parallel Magnetic Circuit Motor; and U.S. patent application Ser. No. 13/348,632, filed January 2012, entitled Magnetically Isolated Phase Interior Permanent Magnet Electrical Rotating Machine.

FEDERALLY SPONSORED RESEARCH OR DEVELOPMENT

Not Applicable.

COMPACT DISK APPENDIX

Not Applicable.

BACKGROUND

A rotating machine, such as a motor, includes a stator assembly, a rotor assembly, and an air gap between the stator assembly and the rotor assembly defining a rotor-stator interface. Stator and rotor assemblies for different motor classes include different components. Thus, a stator assembly for one type of motor is different than a stator assembly for a different type of motor. Manufacturing the different motor classes thus proves costly and inefficient.

SUMMARY

A manufacturing process includes selecting two exchangeable stator components from a stator component group consisting of a stator spacer ring and an axially magnetized stator magnet ring to be a first input with three stator rings to manufacture a motor having a motor class, the exchangeable stator components being exchangeable for different exchangeable stator components from the stator component group to manufacture another motor having a different motor class. The manufacturing process also includes selecting two exchangeable rotor components from a rotor component group consisting of a rotor spacer ring and an axially magnetized rotor magnet ring to be a second input with three rotor rings to manufacture the motor having the motor class, the exchangeable rotor components being exchangeable for different exchangeable rotor components from the rotor component group to manufacture another motor having another different motor class. The motor having the motor class is manufactured with the three stator rings, the three rotor rings, the first input, and the second input. The exchangeable stator components are a same type of exchangeable stator component from the stator component group. The different exchangeable stator components are the same type of exchangeable stator component from the stator component group as each other but a different type of exchangeable stator component from the stator component group than the exchangeable stator components. The exchangeable rotor components are a same type of exchangeable rotor component from the rotor component group. The different exchangeable rotor components are the same type of exchangeable rotor component from the rotor component group as each other but a different type of exchangeable rotor component from the rotor component group than the exchangeable rotor components.

A motor comprises three stator rings, three rotor rings, a first input, and a second input. The first input comprises two exchangeable stator components selected from a stator component group consisting of a stator spacer ring and an axially magnetized stator magnet ring. The second input comprises two exchangeable rotor components selected from a rotor component group consisting of a rotor spacer ring and an axially magnetized rotor magnet ring. The first input and the second input determine a motor class for the motor, the exchangeable stator components being exchangeable for different exchangeable stator components from the stator component group to manufacture another motor having a different motor class, the exchangeable rotor components being exchangeable for different exchangeable rotor components from the rotor component group to manufacture another motor having another different motor class. The exchangeable stator components are a same type of exchangeable stator component from the stator component group. The different exchangeable stator components are the same type of exchangeable stator component as each other but a different type of exchangeable stator component from the stator component group than the exchangeable stator components. The exchangeable rotor components are a same type of exchangeable rotor component from the rotor component group. The different exchangeable rotor components are the same type of exchangeable rotor component from the rotor component group as each other but a different type of exchangeable rotor component from the rotor component group than the exchangeable rotor components.

BRIEF DESCRIPTION OF THE DRAWINGS

FIG. 1 is a diagram of selectable rings for a stator and a rotor of a transformable (XForm) motor.

FIG. 2A-2B is a diagram of a two-phase XForm motor with a stator assembly and a rotor assembly.

FIG. 2C-2D is a diagram of a three-phase XForm motor with a stator assembly and a rotor assembly.

DETAILED DESCRIPTION

Figure 3:
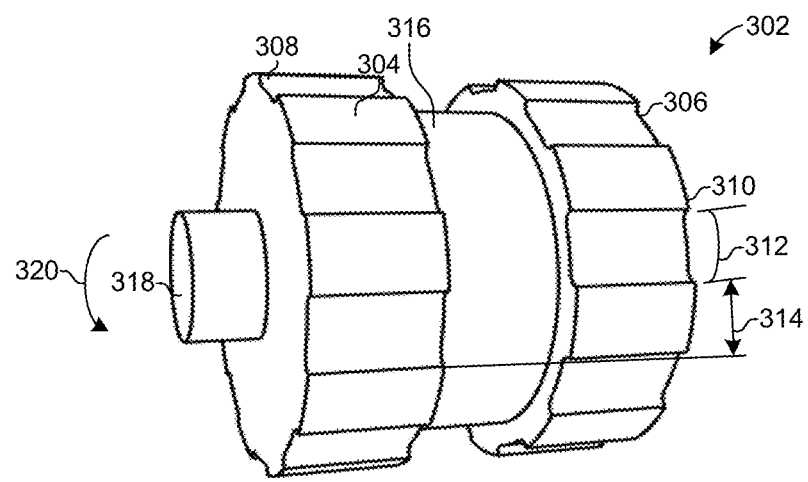
FIG. 3 is a diagram of a rotor assembly of an XForm motor.

A rotating machine, such as a motor, includes a stator assembly, a rotor assembly, and an air gap between the stator assembly and the rotor assembly defining a rotor-stator interface. Exchangeable stator components may be selected and exchangeable rotor components may be selected to transform a motor from one motor class to another motor class. A motor class includes a switched reluctance (SR) motor class, a parallel path magnetic technology (PPMT) motor class, or an interior permanent magnet (IPM) motor class. A motor class alternately is referred to as a motor type.

FIG. 1 is an exemplary embodiment of selectable rings for a stator assembly and a rotor assembly of a transformable (XForm) motor. One or more stator rings 102 or one or more axially magnetized stator ring magnets 104 (collectively, stator components) are selected for a stator assembly for an electrical rotating machine, such as a motor. The stator assembly also includes at least two outer stator rings. One or more rotor rings 106 or one or more axially magnetized rotor ring magnets 108 (collectively, rotor components) are selected for use in a rotor assembly for the electrical rotating machine, such as a motor. The rotor assembly also includes at least two outer rotor rings. By selecting between stator rings 102 or an axially magnetized stator ring magnet 104 for use in a stator of a stator assembly and selecting between rotor rings 106 or an axially magnetized rotor ring magnet 108 for use in a rotor of a rotor assembly determines whether a motor is an SR motor, a PPMT motor, or an IPM motor.

By changing the stator components 102 or 104 for the stator assembly and the rotor components 106 or 108 for the rotor assembly, the electrical rotating machine with the selected stator and rotor components becomes different motor classes, such as an SR motor class, a PPMT motor class, and an IPM motor class. Thus, a machine of one motor class with a stator ring 102 can be manufactured on the same manufacturing equipment 110 of a manufacturing facility as a machine of a different motor class with a stator ring magnet 104 by replacing the stator ring 102 with a stator ring magnet 104. Similarly, a machine of one motor class with a rotor ring 106 can be manufactured on the same manufacturing equipment 110 of a manufacturing facility as a machine of a different motor class with a rotor ring magnet 108 by replacing the stator ring 102 with a rotor ring magnet 104.

The same manufacturing equipment 110 of a manufacturing facility then can be used to produce different motor classes, including one or more SR motors, one or more PPMT motors, and one or more IPM motors. For example, the manufacturing equipment includes tooling, automated and/or manual machines, computer systems, and other equipment to select one or more stator components 102 or 104 for the stator assembly and one or more rotor components 106 or 108 for the rotor assembly and manufacture different classes of an electrical rotating motor. In one example, the manufacturing equipment includes tooling, computer automated machines, computer systems to operate the machines, and other equipment to receive one or more selected stator components 102 or 104 for the stator assembly and one or more selected rotor components 106 or 108 for the rotor assembly and manufacture different classes of an electrical XForm motor in a motor class based on the selected stator components for the stator assembly and the selected rotor components for the rotor assembly.

In another example, a computer system receives an input indicating selected stator components 102 or 104 for the stator assembly of an XForm motor in a motor class and the selected rotor components 106 or 108 for the rotor assembly of the XForm motor in the motor class and directs automated equipment to use the selected stator components and selected rotor components as inputs to the manufacturing equipment and to manufacture an XForm motor in the motor class with a stator assembly and a rotor assembly based on the selected stator components and the selected rotor components. The computer system receives another input indicating a different selected stator components 102 or 104 for the stator assembly of a different XForm motor of a different motor class and/or a different selected rotor components 106 or 108 for the rotor assembly of the different XForm motor of a different motor class and directs automated equipment to use the different selected stator components and/or the different selected rotor components as inputs to the manufacturing equipment and to manufacture the different XForm motor of the different motor class with a stator assembly and a rotor assembly based on the different selected stator components and/or the different selected rotor components.

The manufacturing facility having the manufacturing equipment 110 enjoys cost savings by being able to manufacture different motor classes using the same equipment. Moreover, the stator components 102 and 104 are sized to be exchangeable with each other, and selection of one or the other exchangeable stator components transforms a motor from one motor class to another motor class and transforms the manufacturing equipment from making one motor class to another motor class easily. Similarly, the rotor components 106 and 108 are sized to be exchangeable with each other, and selection of one or the other exchangeable rotor components transforms a motor from one motor class to another motor class and transforms the manufacturing equipment from making one motor class to another motor class easily.

Moreover, because the stator components 102 and 104 and the rotor components 106 and 108 are exchangeable and transformative, the manufacturing facility having the manufacturing equipment 110 can readily manufacture an N-phase motor of the different motor classes, where N is an integer equal to 2 or greater than 2, such as a 2-phase motor or a 3-phase motor.

An SR motor does not have any permanent magnets. A PPMT motor has permanent magnets in the stator assembly. For example, the PPMT motor has a rotor assembly without magnets and a stator assembly with magnets, wherein the rotor assembly, stator assembly, and phase windings produce unidirectional current and torque with electrically independent phases. Other examples of a PPMT motor are described in U.S. Publication No. 2011/0089775, filed Oct. 19, 2010, entitled Parallel Magnetic Circuit Motor, which is incorporated herein by reference. An IPM motor has one or more interior permanent magnets in the rotor assembly. For example, an IPM motor has a stator assembly without magnets and a rotor assembly with a solid axially magnetized ring magnet having a single magnetic polarity.

Referring to FIG. 1 and FIGS. 2A-2D, a stator ring 102 can be an outer stator ring 202 or 204 or an interior stator ring 206. An outer stator ring 202 or 204 is one of the two outer rings of a stator assembly 208 or 210 of a 2-phase, 3-phase, or other phase motor. An interior stator ring 206 is a stator ring between the two outer stator rings 202 and 204 of a stator assembly 210 of a 3-phase or other greater than 3-phase motor. In one embodiment, a stator assembly of an N-phase motor as N total number of stator rings, where N is an integer equal to 2 or greater than 2. Thus, a stator assembly of a 2-phase motor has two stator rings, a 3-phase motor has three stator rings, and so on. A stator ring is sometimes simply referred to as a stator herein.

In one embodiment, a width ($W_{SI}$) of an interior stator ring 206 of a stator assembly 210 of a 3 or more phase machine is wider than a width ($W_{SO}$) of an outer stator ring 202 or 204. The increased width ($W_{SI}$) of the interior stator ring 206 is due to the interior stator ring carrying flux 212 and 214 from two other stator rings along two flux paths, which in the case of a 3-phase machine is the two outer stator rings 202 and 204. In one example, the width ($W_{SI}$) of an interior stator ring 206 of a stator assembly 210 of a 3 or more phase machine is approximately two times wider than the width ($W_{SO}$) of an outer stator ring 202 or 204. In another example, the width ($W_{SI}$) of an interior stator ring 206 of a stator assembly 210 of a 3 or more phase machine is approximately between 1.5-2.5 times wider than the width ($W_{SO}$) of an outer stator ring 202 or 204. Though, the width of an interior stator ring 204 may be different in other examples.

The stator ring 102 is, for example, a stack of laminated steel or other metal core sheets (laminated stack) or a sintered ring made from a sintered material.

Sintering is a method used to create objects from small particles, coated particles, or powders. For example, sintering is based on atomic diffusion in which the atoms in the material diffuse across the boundaries of the material, fusing the material together. The material is heated enough so much that the out portion of the material bonds together but not so much that the entire material melts. In one example, smaller particles of metal are coated, such as with an insulation. The coated material is heated so that the insulation melts, bonding the metal particles together through the insulation. Because the sintered material includes insulated particles that are heated just enough to be bonded and not melt the entire material, the sintered material effectively reduces the effects of eddy current losses. Blue stone is an example of a sintered material.

The stator ring 102 may be a stator spacer ring or a stator ring with two or more teeth around which phase coils can be wound (phase coils stator ring). The stator spacer ring may be, for example, a laminated stack. In one embodiment, the stator spacer ring does not have teeth about which phase coils are wound.

A phase coils stator ring has two or more stator teeth defining two or more stator poles with a winding slot between the stator teeth. A phase coils stator ring may have a selected number of stator poles, such as 4, 6, 12, or another number. A higher number of stator poles results in a higher switching frequency, but more core losses than a lower number of stator poles. A lower number of stator poles results in a lower switching frequency, but less core losses than a higher number of stator poles.

The stator pole pitch (also referred to as stator pole arc) is the angular distance between stator teeth, such as in degrees or radians as measured from the center of stator. The stator may have the same or different stator pole pitch between two or more stator teeth. The stator pole pitch defines the position of a winding slot, for example, by defining the distance between winding slots of the stator (and, therefore, the stator teeth).

A phase winding (also referred to as a phase coil) can be wound about each stator tooth. In one example, the phase winding is a concentrated phase winding. In another example, the phase winding is a lap wound phase winding.

Optionally, the stator ring may have two or more stator phase sections (also referred to as sectors) that are magnetically isolated from each other by at least one isolation region. An isolation region is a magnetically inactive region or area, such as one or more apertures and/or one or more areas with magnetically inactive material that magnetically isolates one stator phase section from another stator phase section so that magnetic flux does not travel between the two magnetically isolated phase sections.

A middle stator ring 215 (a ring between the two outer stator rings) may be a spacer ring or a stator ring magnet. The spacer ring may be, for example, a laminated stack. In one embodiment, the stator spacer ring does not have teeth.

A stator ring magnet 104 (alternately, stator magnet ring) is an axially magnetized ring magnet. That is, the entire ring magnet has a single magnetic polarity along an axis, such as north to south or south to north. The axially magnetized ring magnet may be a simple solid continuous axially magnetized ring magnet or a non-magnetic retainer ring with permanent magnets all mounted in the same magnetic polarity, for example all north to south or all south to north so that the sums of all north facing magnets form a single north pole and the sum of all south facing magnets form a single south pole. Alternately, the stator ring magnet may be composed of individual permanent magnets mounted in the same magnetic polarity to a stator end ring or stator retainer ring, such as with glue, bonding, or another mounting method. The permanent magnets for the stator ring magnet 104 may be curved, pie-shaped, rectangular, round, square, or another shape.

In one embodiment, the non-magnetic retainer ring is a ring with U-shaped, pie-shaped, rectangular, or other shaped cups or divisions to hold permanent magnets. In this embodiment, the permanent magnets may be inserted into the non-magnetic retainer after the stator assembly is assembled with the rotor assembly to make the motor. This eliminates special tooling required to assemble a stator assembly that already has permanent magnets with a rotor assembly.

A stator assembly has two or more stator rings and zero or more stator ring magnets. For example, the stator assembly has two outer stator rings and at least one middle stator ring (a ring between the two outer stator rings) that is either a spacer ring or a ring magnet.

Each stator ring in the stator assembly may have two or more phases. A stator assembly for a 2-phase machine has 2 total stator rings that are comprised of two outer stator rings and further has one middle stator ring (a ring between the two outer stator rings) that is either a spacer ring or a ring magnet. A stator assembly for a 3-phase machine has 3 total stator rings, including two outer stator rings and an interior stator ring, and at least two middle stator rings (rings between the two outer stator rings) that both are either a spacer ring or a ring magnet. A stator assembly for an N-phase machine has N total stator rings, including two outer stator rings and N−2 interior stator rings, and at least N−1 total middle stator rings (rings between the two outer stator rings) that all are either a spacer ring or a ring magnet, where N is an integer equal to 2 or greater than 2.

The phase coils (or stator poles) in a stator ring may be aligned with the phase coils (or stator poles) of another stator ring or offset by a selected angular or circumferential offset distance (such as a number of radians or degrees) with respect to the stator coils (or stator poles) of the other stator ring and with respect to a reference axis or reference point on the stators. If the phase coils (or stator poles) are aligned, then the locations of the phase coils (or stator poles) of one stator match the locations of phase coils (or stator poles) in the other stator. If the phase coils (or stator poles) are offset, then the locations of the phase coils (or stator poles) of one stator are clockwise or counter clockwise a selected offset distance (for example, angular or circumferential distance or number of degrees) along the axis of rotation with respect to the locations of phase coils (or stator poles) in the other stator and with respect to a reference axis or reference point on the stators. For example, a reference may be designated on a first stator as zero degrees on the stator along the axis of rotation and a second reference may be designated on the second stator as zero degrees on the stator along the axis of rotation. The first and second references may be aligned or offset by an offset distance.

The phase coils in each stator ring are wound so that the phase coils in a phase are energized by an excitation source. The excitation source may have, for example, a sin wave, a square wave, a trapezoidal wave, or another shape wave form. Different motor classes may have different excitation shape wave forms. The phases of the stator are energized in a sequence.

In one example, each XForm stator includes two or more lam stacks that can have the same or different number of poles and the same or different pole pitches. A stator in a stator assembly optionally may have a different number of poles than another stator in a stator assembly.

Referring still to FIG. 1 and FIGS. 2A-2B, a rotor ring 106 can be an outer rotor ring 214 or 216 or an interior rotor ring 218. An outer rotor ring 214 or 216 is one of the two outer rings of a rotor assembly 220 or 222 of a 2-phase, 3-phase, or other phase motor. An interior rotor ring 218 is a rotor ring between the two outer rotor rings 214 and 216 of a rotor assembly 222 of a 3-phase or other greater than 3-phase motor. In one embodiment, a rotor assembly of an N-phase motor as N total number of rotor rings, where N is an integer equal to 2 or greater than 2. Thus, a rotor assembly of a 2-phase motor has two rotor rings, a 3-phase motor has three rotor rings, and so on. A rotor ring is sometimes simply referred to as a rotor herein.

In one embodiment, a width ($W_{RI}$) of an interior rotor ring 218 of a rotor assembly 222 of a 3 or more phase machine is wider than a width ($W_{RO}$) of an outer rotor ring 214 or 216. The increased width ($W_{RI}$) of the interior rotor ring 218 is due to the interior rotor ring carrying flux from two other rotor rings over to flux paths, which in the case of a 3-phase machine is the two outer rotor rings. In one example, the width ($W_{RI}$) of an interior rotor ring 218 of a rotor assembly of a 3 or more phase machine 222 is approximately two times wider than the width ($W_{RO}$) of an outer rotor ring 214 or 216. In another example, the width ($W_{RI}$) of an interior rotor ring 218 of a rotor assembly 222 of a 3 or more phase machine is approximately between 1.5-2.5 times wider than the width ($W_{RO}$) of an outer rotor ring 214 or 216. Though, the width of an interior rotor ring 218 may be different in other examples.

The rotor ring 106 is, for example, a stack of laminated steel or other metal core sheets (laminated stack) or a sintered ring made from a sintered material.

The rotor ring 106 may be a rotor spacer ring or a ring with two or more rotor teeth defining two or more rotor poles. A rotor ring 106 may have a selected number of rotor poles, such as 2, 3, 9, or another number. A higher number of rotor poles results in a higher switching frequency, but more core losses than a lower number of rotor poles. A lower number of rotor poles results in a lower switching frequency, but less core losses than a higher number of rotor poles.

A rotor pole pitch (also referred to as rotor pole arc) is the angular distance between rotor teeth, such as in degrees or radians as measured from the center of rotor. The rotor may have the same or a different rotor pole pitch between two or more rotor teeth. The rotor pole pitch defines the position of one rotor tooth to the next rotor tooth.

A middle rotor ring 224 (a ring between the two outer rotor rings) may be a spacer ring or a rotor ring magnet. The rotor spacer ring may be, for example, a laminated stack. A rotor spacer ring need not have teeth.

A rotor ring magnet (alternately, rotor magnet ring) is an axially magnetized ring magnet. That is, the entire ring magnet has a single magnetic polarity along an axis, such as north to south or south to north. The axially magnetized ring magnet may be a simple solid continuous axially magnetized ring magnet. In one embodiment, the rotor ring magnet may be a non-magnetic retainer ring with permanent magnets all mounted in the same magnetic polarity, for example all north to south or all south to north so that the sums of all north facing magnets form a single north pole and the sum of all south facing magnets form a single south pole. Alternately, the rotor ring magnet may be composed of individual permanent magnets mounted in the same magnetic polarity to a rotor end ring or rotor retainer ring, such as with glue, binding, or another mounting method. The permanent magnets for the rotor ring magnet 108 may be curved, pie-shaped, rectangular, round, square, or another shape.

A rotor assembly for an N-phase machine has N total rotor rings, including two outer rotor rings and N−2 interior rotor rings, and at least N−1 total middle rotor rings that all are either a spacer ring or a ring magnet, where N is an integer equal to 2 or greater than 2. Thus, a rotor assembly has two or more rotor rings and at least one middle rotor ring that is either a spacer ring or a ring magnet.

In one embodiment, a rotor assembly 220 for a 2-phase motor has 2 total rotor rings that are comprised of two outer rotor rings 214 and 216 and further has one middle rotor ring 224 that is either a spacer ring or a ring magnet. The rotor assembly 220 also has a shaft 226. In another embodiment, a rotor assembly 222 for a 3-phase machine has 3 total rotor rings, including two outer rotor rings 214 and 216 and an interior rotor ring 218, and at least two middle rings 224 that both are either a spacer ring or a ring magnet. The rotor assembly 222 also has a shaft 228.

The poles in a rotor ring may be aligned with the poles of another rotor ring or offset by a selected angular or circumferential offset distance (such as a number of radians or degrees) with respect to the rotor poles of the other rotor ring and with respect to a reference axis or reference point on the rotors. If the rotor poles are aligned, then the locations of the rotor poles of one rotor match the locations of rotor poles in the other rotor. If the rotor poles are offset, then the locations of the rotor poles of one rotor are clockwise or counter clockwise a selected distance (for example, angular or circumferential distance or number of degrees) along the axis of rotation with respect to the locations of rotor poles in the other rotor. For example, a reference may be designated on a first rotor as zero degrees on the rotor along the axis of rotation and a second reference may be designated on the second rotor as zero degrees on the rotor along the axis of rotation. The first and second references may be aligned or offset by an offset distance.

The 2-phase stator assembly 208 and the 2-phase rotor assembly 220 form a 2-phase XForm motor 230. The 3-phase stator assembly 210 and the 3-phase rotor assembly 222 form a 3-phase XForm motor 232.

In one other example of a PPMT motor, a rotor may have two or multiples of two permanent magnets arranged with opposing magnetic poles (e.g. a north pole of a magnet facing a north pole of another magnet or a south pole of a magnet facing a south pole of another magnet), which is referred to herein as a parallel arrangement. The opposing magnetic fields of the permanent magnets in the rotor direct magnetic flux through a pole of the rotor, through the air gap of the rotor-stator interface, and through a pole of the stator. The machine may be configured, for example, as a motor or a generator. A motor may be configured, for example, as a hub motor or other motor.

FIG. 3 is an exemplary embodiment of a 9 pole rotor assembly 302 of an XForm motor. The front rotor 304 and the rear rotor 306 have 9 rotor poles 308 and 310, respectively, and rotor pole pitches 312 between the poles. The front rotor 304 and the rear rotor 306 of FIG. 3 have identical numbers of poles and identical pole pitches. The rotor poles 308 in the front rotor 302 are offset from the rotor poles 310 in the rear rotor 306 by a selected offset distance 314, such as an angular distance, with respect to a reference axis or reference point on the rotors. The selection of whether a permanent magnet ring or a rotor ring, such as a lamination stack, is placed in the middle ring 316 between the rotors 304 and 304 determines whether the X-FORM motor is an SR motor, a PPMT motor, or an IPM motor as shown below. The rotor assembly includes a shaft 318, and the assembly rotates about the shaft around an axis of rotation 320.

Figure 4:
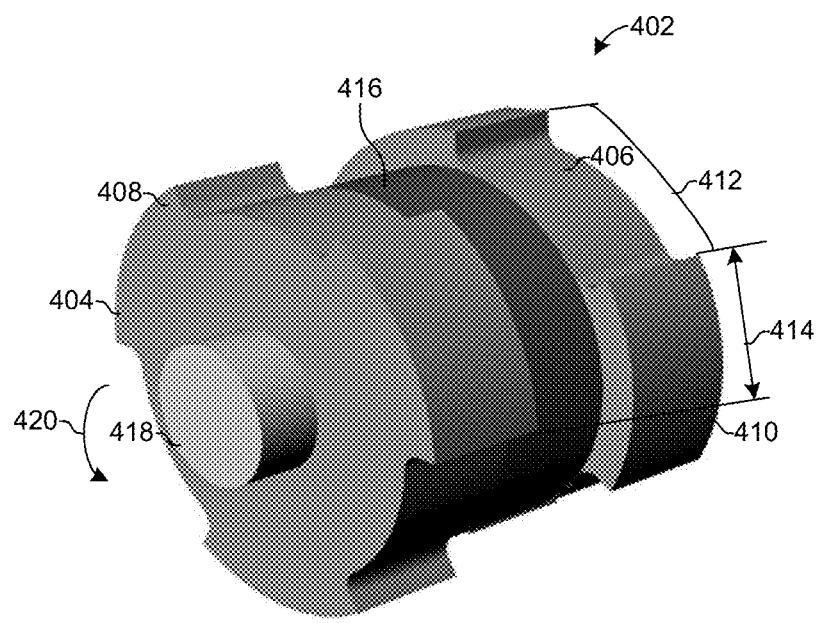
FIG. 4 is a diagram of a rotor assembly with offset rotors.

FIG. 4 is an exemplary embodiment of a 3 pole rotor assembly 402 of an XForm motor with offset rotors. The front rotor 404 and the rear rotor 406 have 3 rotor poles 408 and 410, respectively, and rotor pole pitches 412 between the poles. The front rotor 404 and the rear rotor 406 of FIG. 4 have identical numbers of poles and identical pole pitches. The rotor poles 408 in the front rotor 402 are offset from the rotor poles 410 in the rear rotor 406 by a selected offset distance 414, such as an angular distance, with respect to a reference axis or reference point on the rotors. The selection of whether a permanent magnet ring or a rotor ring, such as a lamination stack, is placed in the middle ring 416 between the rotors 404 and 404 determines whether the X-FORM motor is an SR motor, a PPMT motor, or an IPM motor as shown below. The rotor assembly includes a shaft 418, and the assembly rotates about the shaft around an axis of rotation 420.

Figure 5:
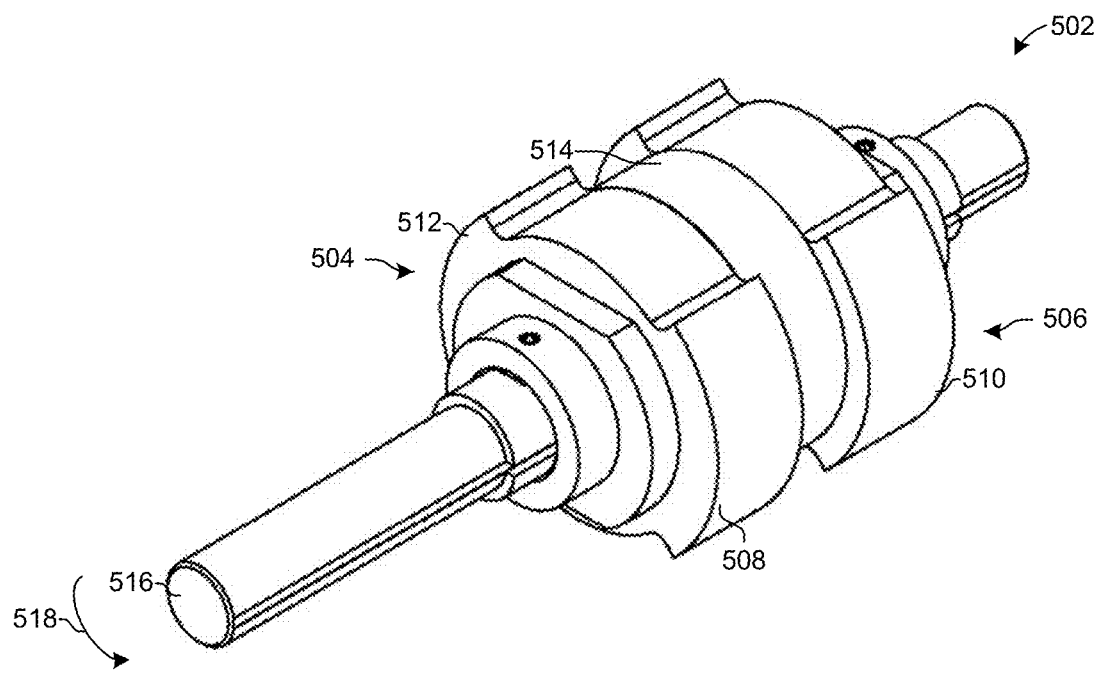
FIG. 5 is a diagram of a rotor assembly with aligned rotors.

FIG. 5 is an exemplary embodiment of a rotor assembly 502 of an XForm motor with aligned rotors. The front rotor 504 and the rear rotor 506 have 2 rotor poles 508 and 510 and rotor pole pitches 512 between the poles. The front rotor 504 and the rear rotor 506 of FIG. 5 have identical numbers of poles and identical pole pitches. The rotor poles 508 in the front rotor 502 are aligned with the rotor poles 510 in the rear rotor 506. The selection of whether a permanent magnet ring or a rotor ring, such as a lamination stack, is placed in the middle ring 514 between the rotors 404 and 404 determines whether the X-FORM motor is an SR motor, a PPMT motor, or an IPM motor as shown below. The rotor assembly includes a shaft 516, and the assembly rotates about the shaft around an axis of rotation 518.

Figure 6:
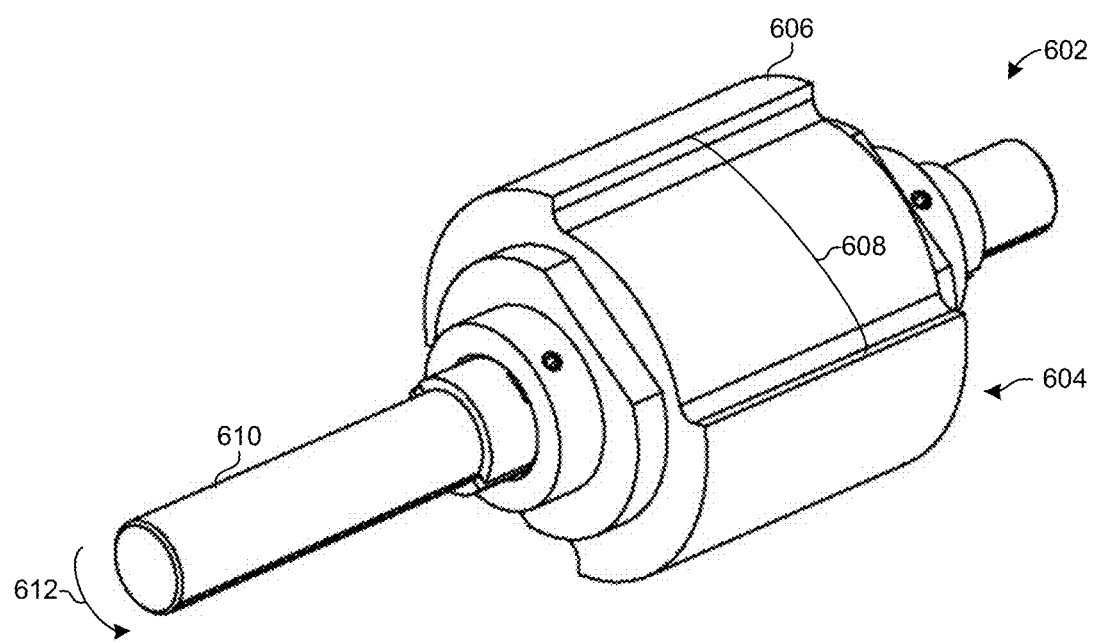
FIG. 6 is a diagram of a rotor assembly with a unitary rotor.

FIG. 6 is an exemplary embodiment of a rotor assembly 602 of an XForm motor with a unitary solid rotor. The rotor 604 has 2 rotor poles 606 and rotor pole pitches 608 between the poles. The rotor 604 is a unitary piece, such as a lamination stack or a sintered material. The rotor assembly does not have a middle ring since it is unitary. The rotor assembly may be used, for example, in an SR motor. The rotor assembly 602 includes a shaft 610, and the assembly rotates about the shaft around an axis of rotation 612.

Figure 7:
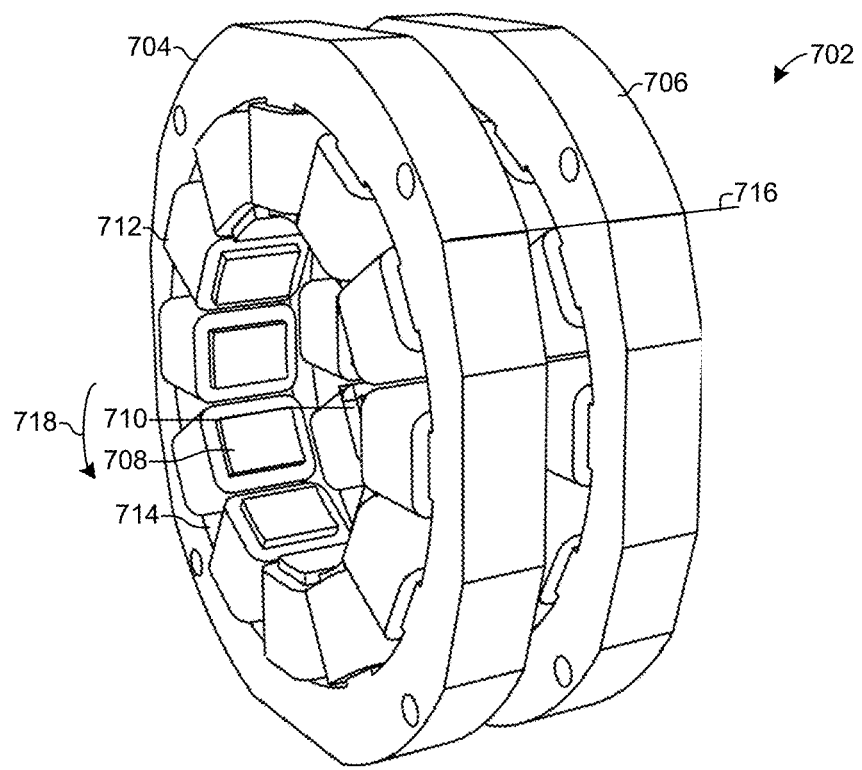
FIG. 7 is a diagram of a stator assembly with aligned stators.

FIG. 7 is an exemplary embodiment of a stator assembly 702 with aligned stators. The front stator 704 and rear stator 706 each have 12 teeth defining 12 poles 708 and 710, respectively, winding slots with phase windings 712 around the teeth, and pole pitches 714 between the poles. The front stator 704 and the rear stator 706 of FIG. 7 have identical numbers of poles and identical pole pitches. The front stator poles 708 in the front stator 704 are aligned with the rear stator poles 710 in the rear stator 706 along a reference axis 716. The selection of whether a permanent magnet ring or a stator ring, such as a lamination stack, is placed between the stators 702 and 704 determines whether the X-FORM motor is an SR motor, a PPMT motor, or an IPM motor as shown below. The stator assembly 702 rotates about an axis of rotation 718.

Figure 8:
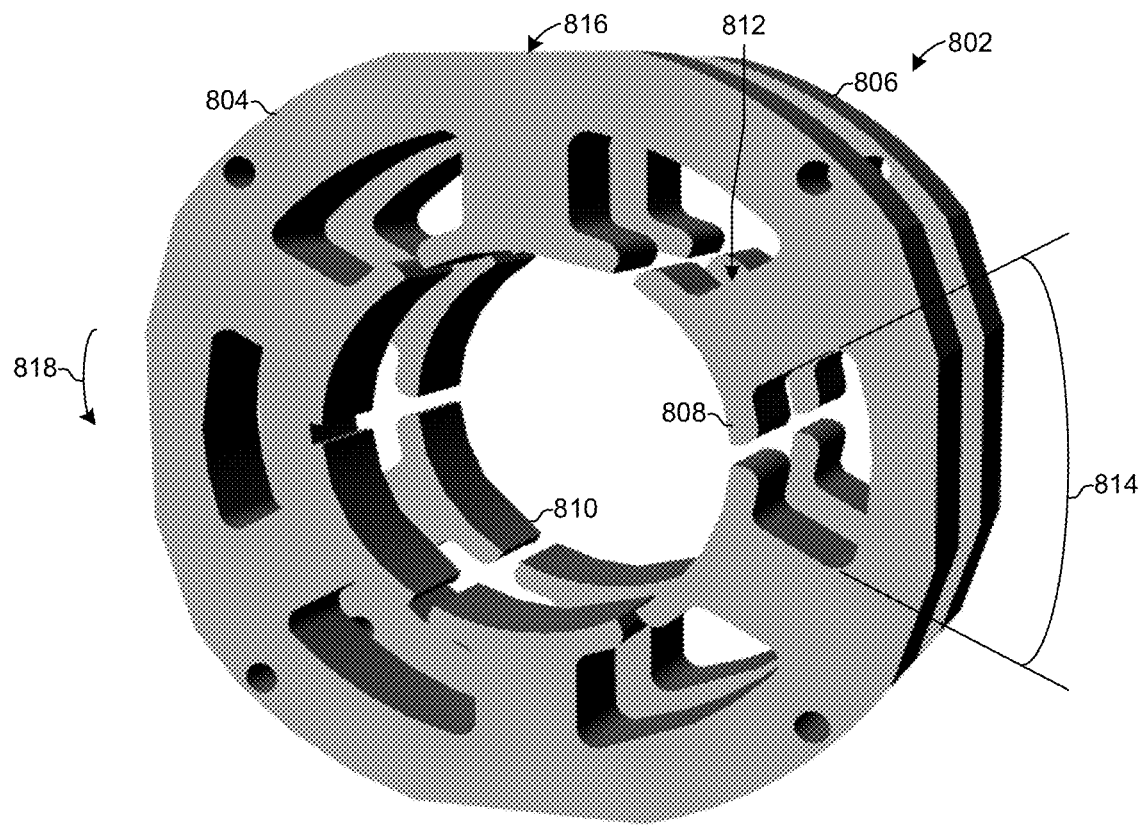
FIG. 8 is a diagram of a stator assembly with aligned stators.

FIG. 8 is an exemplary embodiment of a stator assembly 802 with aligned stators. The front stator 804 and rear stator 806 each have 12 teeth defining 12 poles 808 and 810, respectively, winding slots 812 between the teeth about which windings may be wound, and pole pitches 814 between the poles. The front stator 804 and the rear stator 806 of FIG. 8 have identical numbers of poles and identical pole pitches. The front stator poles 808 in the front stator 804 are aligned with the rear stator poles 810 in the rear stator 806 along a reference axis 816. The selection of whether a permanent magnet ring or a stator ring, such as a lamination stack, is placed between the stators 802 and 804 determines whether the X-FORM motor is an SR motor, a PPMT motor, or an IPM motor as shown below. The stator assembly 802 rotates about an axis of rotation 818.

Figure 9:
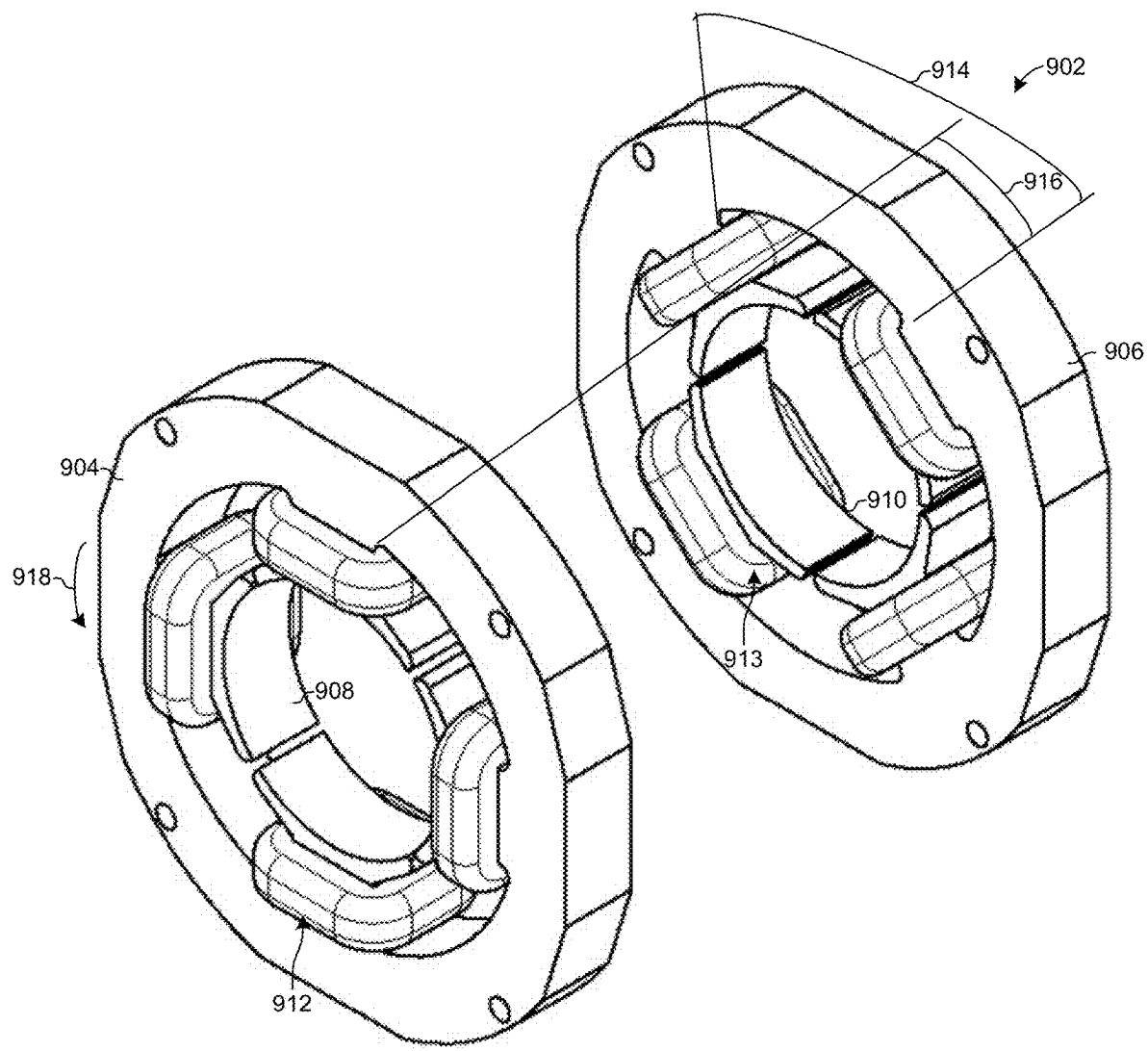
FIG. 9 is a diagram of a stator assembly with offset stators.

FIG. 9 is an exemplary embodiment of a stator assembly 902 of an XForm motor with offset stators. The front stator 904 and rear stator 906 each have 4 teeth defining 4 poles 908 and 910, respectively, winding slots with phase windings 912 around the teeth, and pole pitches 914 between the poles. The front stator 904 and the rear stator 906 of FIG. 9 have identical numbers of poles and identical pole pitches. The front stator poles 908 in the front stator 904 are offset from the rear stator poles 910 in the rear stator 906 by a selected offset distance 916, such as an angular distance, with respect to a reference axis or reference point on the stators. The selection of whether a permanent magnet ring or a stator ring, such as a lamination stack, is placed between the stators 902 and 904 determines whether the X-FORM motor is an SR motor, a PPMT motor, or an IPM motor as shown below. The stator assembly 902 rotates about an axis of rotation 918.

Figure 10:
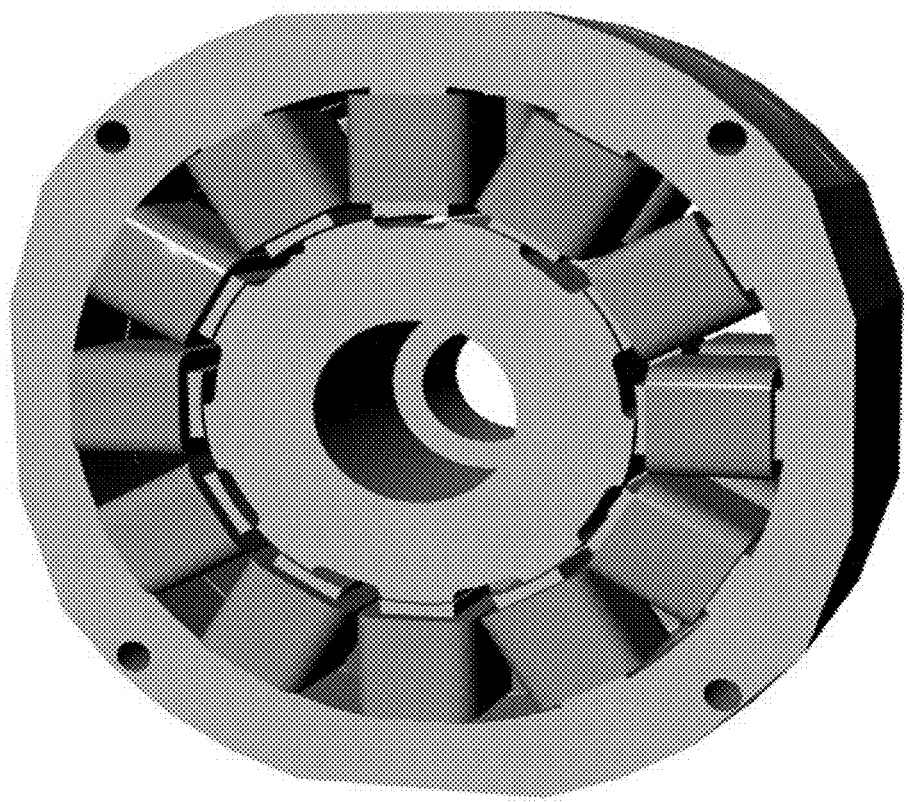
FIG. 10 is a diagram of an XForm motor with a stator having 12 stator poles with and a rotor having 9 rotor poles.

FIG. 10 is an exemplary embodiment of an XForm motor with a stator having 12 stator poles with and a rotor having 9 rotor poles. The XForm motor 1002 includes the stator assembly 702 of FIG. 7 and the rotor assembly 302 of FIG. 3.

Figure 11:
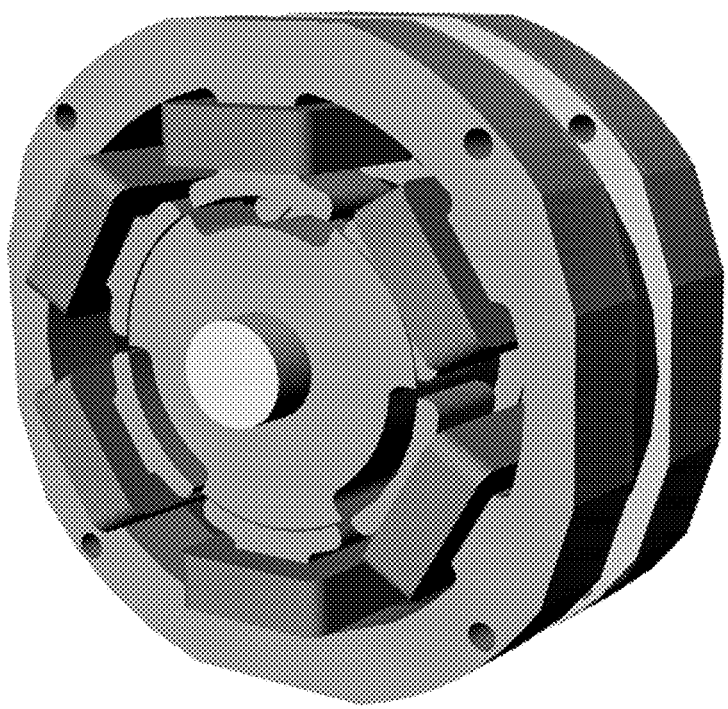
FIG. 11 is a diagram of an XForm motor with a stator having 6 stator poles with and a rotor having 3 rotor poles.

FIG. 11 is an exemplary embodiment of an XForm motor with a stator having 6 stator poles with and a rotor having 3 rotor poles. The XForm motor 1102 includes the stator assembly 802 of FIG. 8 and the rotor assembly 402 of FIG. 4.

Figure 12A:
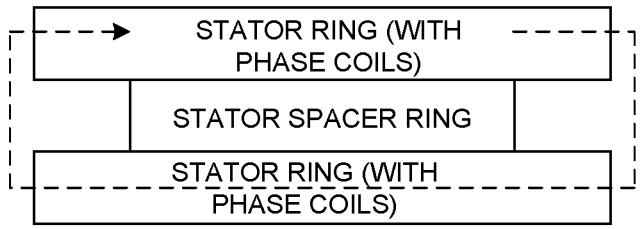
FIGS. 12A-B are diagrams of a switched reluctance (SR) 2-phase motor with a stator assembly and rotor assembly.
Figure 12B:
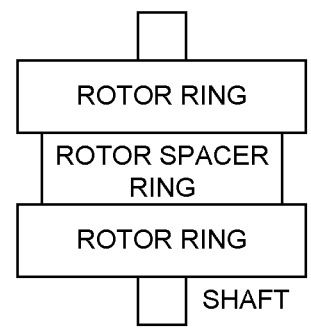

FIGS. 12A-B depict an exemplary embodiment of a switched reluctance (SR) 2-phase XForm motor 1202 with a stator assembly 1204 and rotor assembly 1206. The stator assembly 1204 includes two stator rings 1208 and 1210 as the outer stator rings and a stator spacer ring 1212 as the middle stator ring. The stator rings 1208 and 1210 and the stator spacer ring 1212 each may be comprised of laminated stacks.

The rotor assembly 1206 includes two rotor rings 1214 and 1216 as the outer rotor rings, a rotor spacer ring 1218 as the middle rotor ring, and a shaft 1220. The rotor rings 1214 and 1216 and the rotor spacer ring 1218 each may be comprised of laminated stacks.

Figure 12C:
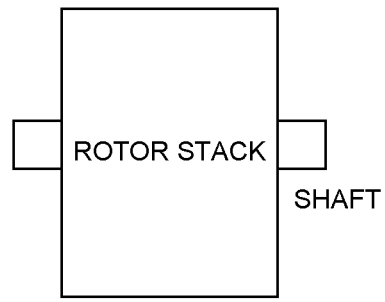
FIG. 12C is a diagram of an alternate rotor assembly for an SR 2-phase motor.

FIG. 12C is an exemplary embodiment of an alternate rotor assembly 1222 for an SR 2-phase XForm motor 1202. The rotor assembly 1222 includes a unitary rotor 1224 and a shaft 1226. The unitary rotor 1224 may be comprised of laminated stacks.

Figure 13A:
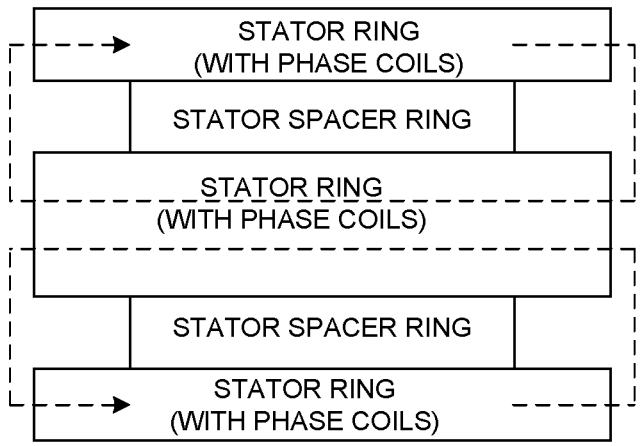
FIGS. 13A-B are diagrams of an SR 3-phase motor with a stator assembly and rotor assembly.
Figure 13B:
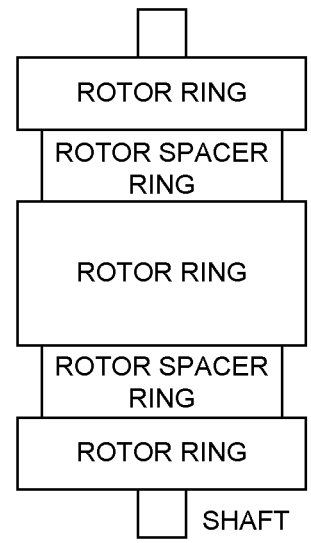

FIGS. 13A-B depict an exemplary embodiment of an SR 3-phase XForm motor 1302 with a stator assembly 1304 and rotor assembly 1306. The stator assembly 1304 includes three stator rings 1308-1312, including two outer stator rings 1308 and 1310 and one interior stator ring 1312, and two stator spacer rings 1314 and 1316 as the middle stator rings. The stator rings 1308-1312 and the stator spacer rings 1314 and 1316 each may be comprised of laminated stacks.

The rotor assembly 1306 includes three rotor rings 1318-1322 as the rotor rings, including two outer rotor rings 1318 and 1320 and one middle rotor ring 1322, two rotor spacer rings 1324 and 1326 as the middle rotor rings, and a shaft 1326. The rotor rings 1318-1322 and the rotor spacer rings 1324 and 1326 each may be comprised of laminated stacks.

Figure 13C:
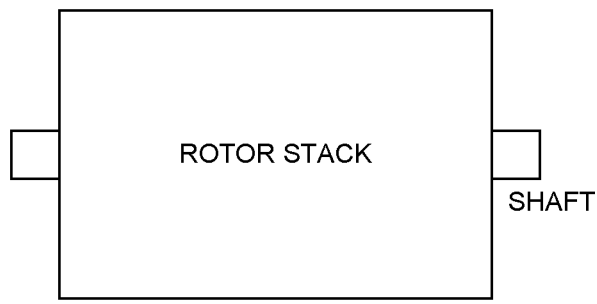
FIG. 13C is a diagram of an alternate rotor assembly for an SR 3-phase motor.

FIG. 13C is an exemplary embodiment of an alternate rotor assembly 1330 for an SR 3-phase XForm motor 1302. The rotor assembly 1330 includes a unitary rotor 1332 and a shaft 1334. The unitary rotor 1332 may be comprised of laminated stacks.

Figure 14:
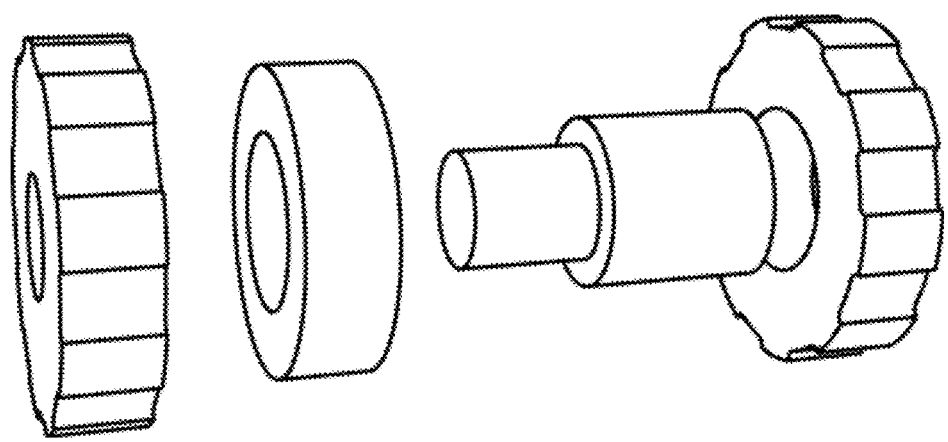
FIG. 14 is an exploded view of a rotor assembly for an SR 2-phase motor.

FIG. 14 is an exemplary embodiment of a rotor assembly 1402 for an SR 2-phase XForm motor. The rotor assembly 1402 includes two rotor rings 1404 and 1406 as the outer rotor rings, a rotor spacer ring 1408 as the middle rotor ring, and a shaft 1410. The rotor rings 1404 and 1406 each have poles 1412 and 1414. The rotor poles 1412 of the front rotor ring 1404 are offset from the rotor poles 1414 of the rear rotor ring 1406 by a selected offset distance 1416 with respect to a reference axis or reference point 1418 on the rotors. The rotor rings 1404 and 1406 and the rotor spacer ring 1408 each may be comprised of laminated stacks.

Figure 15:
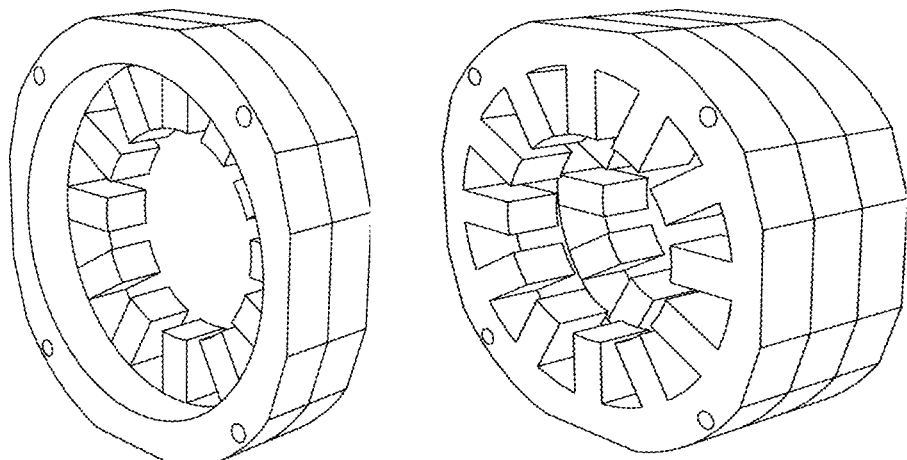
FIG. 15 is a view of a stator assembly without phase coils for an SR 2-phase motor.

FIG. 15 is an exemplary embodiment of a stator assembly 1502 without phase coils for an SR 2-phase XForm motor. The stator assembly 1502 includes two stator rings 1504 and 1506 as the outer stator rings and a stator spacer ring 1508 as the middle stator ring. The stator rings 1504 and 1506 each have stator poles 1510 and 1512. The stator poles 1510 of the front stator ring 1504 are aligned with the stator poles 1512 of the rear stator ring 1506 along a reference axis 1514. The stator rings 1504 and 1506 and the stator spacer ring 1508 each may be comprised of laminated stacks.

Figure 16:
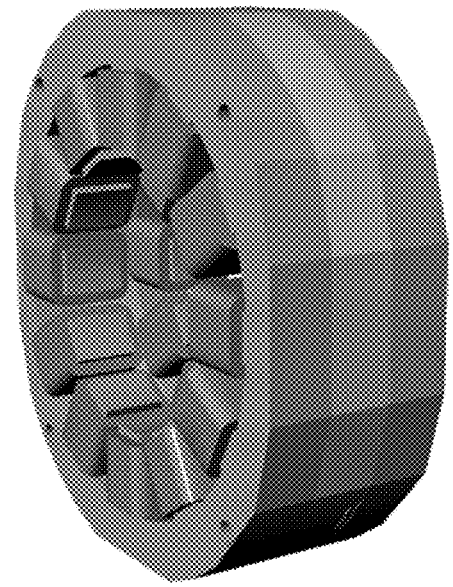
FIG. 16 is a view of a stator assembly with phase coils for an SR 2-phase motor.

FIG. 16 is an exemplary embodiment of a stator assembly 1602 with phase coils for an SR 2-phase motor. The stator assembly 1602 of FIG. 16 includes the stator assembly 1502 of FIG. 15 with phase coils 1604 and 1606 wound about the teeth of the stator rings 1506 and 1508.

Figure 17A:
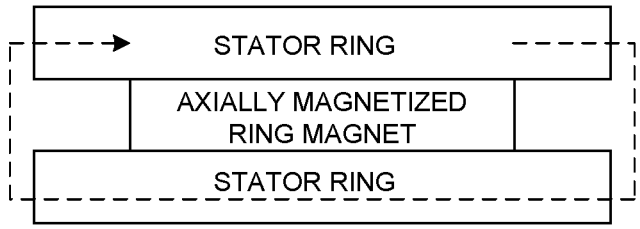
FIGS. 17A-B are diagrams of a PPMT 2-phase motor with a stator assembly and rotor assembly.
Figure 17B:
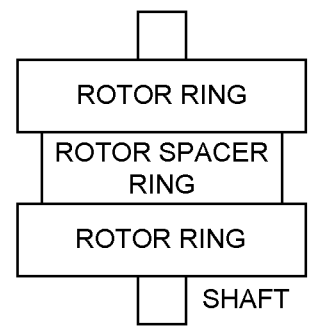

FIGS. 17A-B depict an exemplary embodiment of a parallel path magnetic technology (PPMT) 2-phase XForm motor 1702 with a stator assembly 1704 and rotor assembly 1706. The stator assembly 1704 includes two stator rings 1708 and 1710 as the outer stator rings and a stator magnet ring 1712 as the middle stator ring. The stator rings 1708 and 1710 may be comprised of laminated stacks. The magnet ring 1712 is an axially magnetized ring magnet or a non-magnetic ring with two or more permanent magnets all having the same polarity.

The rotor assembly 1706 includes two rotor rings 1714 and 1716 as the outer rotor rings, a rotor spacer ring 1718 as the middle rotor ring, and a shaft 1720. The rotor rings 1714 and 1716 and the rotor spacer ring 1718 each may be comprised of laminated stacks.

Figure 17C:
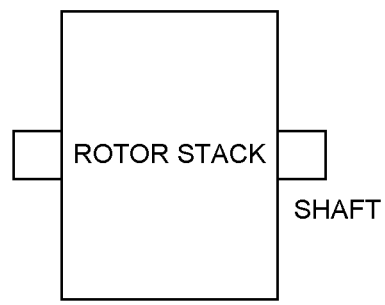
FIG. 17C is a diagram of an alternate rotor assembly for a parallel path magnetic technology (PPMT) 2-phase motor.

FIG. 17C is an exemplary embodiment of an alternate rotor assembly 1722 for a PPMT 2-phase XForm motor 1702. The rotor assembly 1722 includes a unitary rotor 1724 and a shaft 1726. The unitary rotor 1724 may be comprised of laminated stacks.

Figure 18A:
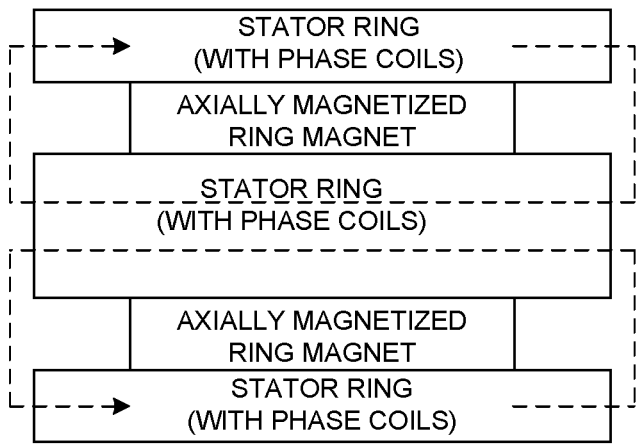
FIGS. 18A-B are diagrams of a PPMT 3-phase motor with a stator assembly and rotor assembly.
Figure 18B:
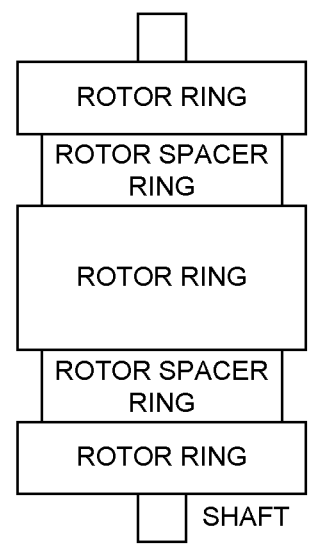

FIGS. 18A-B depicts an exemplary embodiment of a PPMT 3-phase XForm motor 1802 with a stator assembly 1804 and rotor assembly 1806. The stator assembly 1804 includes three stator rings 1808-1812, including two outer stator rings 1808 and 1810 and one interior stator ring 1812, and two stator magnet rings 1814 and 1816 as the middle stator rings. The stator rings 1808-1812 each may be comprised of laminated stacks. The stator magnet rings 1814 and 1816 each are an axially magnetized ring magnet or a non-magnetic ring with two or more permanent magnets all having the same polarity.

The rotor assembly 1806 includes three rotor rings 1818-1822 as the rotor rings, including two outer rotor rings 1818 and 1820 and one middle rotor ring 1822, two rotor spacer rings 1824 and 1826 as the middle rotor rings, and a shaft 1826. The rotor rings 1818-1822 and the rotor spacer rings 1824 and 1826 each may be comprised of laminated stacks.

Figure 18C:
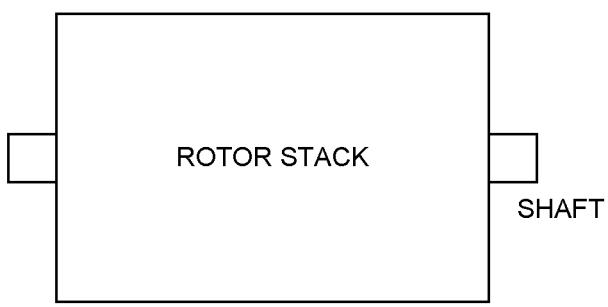
FIG. 18C is a diagram of an alternate rotor assembly for a PPMT 3-phase motor.

FIG. 18C is an exemplary embodiment of an alternate rotor assembly 1830 for a PPMT 3-phase XForm motor 1802. The rotor assembly 1830 includes a unitary rotor 1832 and a shaft 1834. The unitary rotor 1832 may be comprised of laminated stacks.

Figure 19:
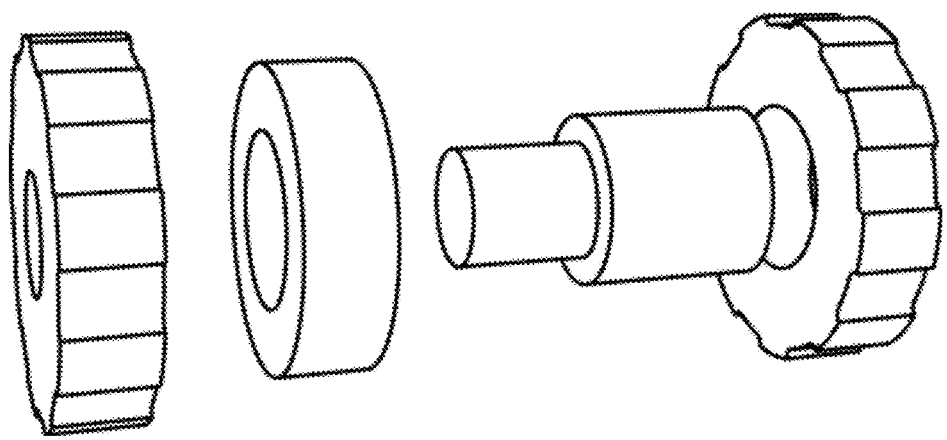
FIG. 19 is an exploded view of a rotor assembly for a PPMT 2-phase motor.

FIG. 19 is an exemplary embodiment of a rotor assembly 1902 for a PPMT 2-phase XForm motor. The rotor assembly 1902 includes two rotor rings 1904 and 1906 as the outer rotor rings, a rotor spacer ring 1908 as the middle rotor ring, and a shaft 1910. The rotor rings 1904 and 1906 each have poles 1912 and 1914. The rotor poles 1912 of the front rotor ring 1904 are offset from the rotor poles 1914 of the rear rotor ring 1906 by a selected offset distance 1916 with respect to a reference axis or reference point 1918 on the rotors. The rotor rings 1904 and 1906 and the rotor spacer ring 1908 each may be comprised of laminated stacks.

Figure 20:
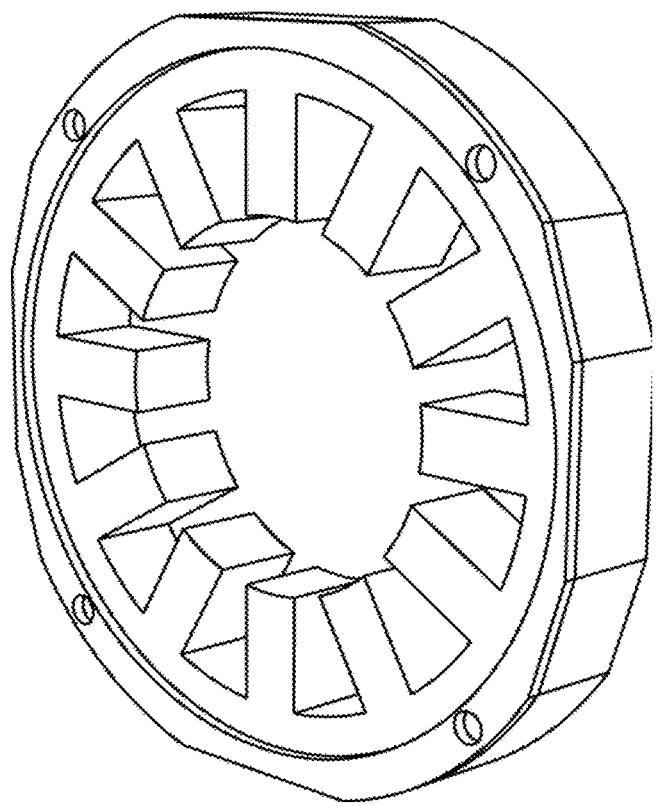
FIG. 20 is a view of a stator with a permanent magnet retainer and without phase coils for a PPMT motor.

FIG. 20 is an exemplary embodiment of a stator 2002 with a permanent magnet retainer and without phase coils for a PPMT motor. The stator 2002 has a stator ring 2004 and a permanent magnet retainer 2006 that retains a permanent magnet ring (see FIG. 21). The permanent magnet ring is the middle ring of the stator assembly.

Figure 21:
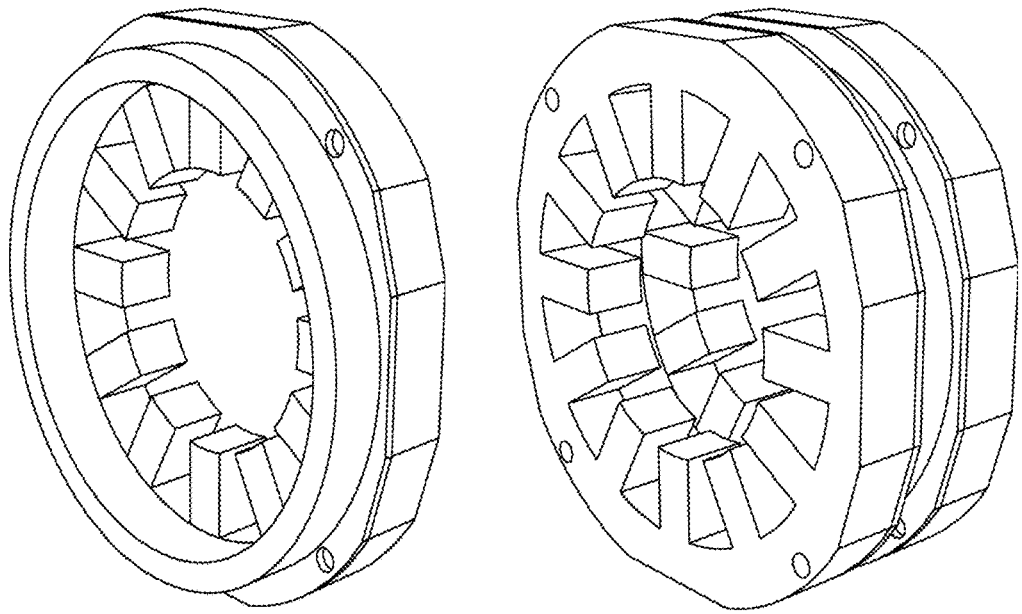
FIG. 21 is a view of a stator assembly for a PPMT 2-phase motor.

FIG. 21 is an exemplary embodiment of a stator assembly 2102 without phase coils for a PPMT 2-phase XForm motor. The stator assembly 2102 includes two stator rings 2104 and 2106 as the outer stator rings and a stator magnet ring 2108 as the middle stator ring. The stator rings 2104 and 2106 each have stator poles 2110 and 2112. The stator poles 2110 of the front stator ring 2004 are aligned with the stator poles 2112 of the rear stator ring 2006 along a reference axis 2114. The stator rings 2104 and 2106 each may be comprised of laminated stacks and have the same magnetic polarity as the magnet ring 2108. The stator magnet ring 2108 is an axially magnetized ring magnet or a non-magnetic ring with two or more permanent magnets all having the same polarity. The stator rings 2104 and 2106 have the same magnetic polarity as the magnet ring 2108. For example, the front stator 2104 has a north polarity, the magnet ring 2108 has a north to south polarity, and the rear stator 2106 has a south polarity.

Figure 22:
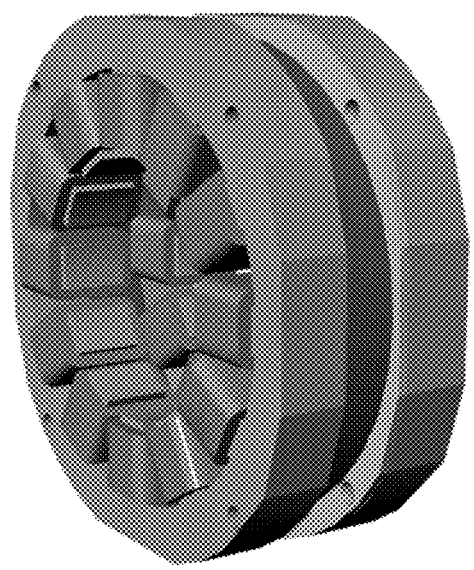
FIG. 22 is a view of a stator assembly with phase coils for a PPMT 2-phase motor.

FIG. 22 is an exemplary embodiment of a stator assembly 2202 with phase coils for a PPMT 2-phase XForm motor. The stator assembly 2202 of FIG. 22 includes the stator assembly 2102 of FIG. 21 with phase coils 2204 and 2206 wound about the teeth of the stator rings 2004 and 2006.

Figure 23A:
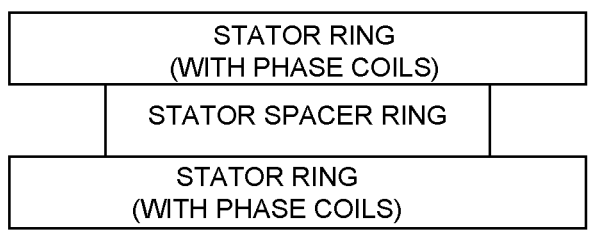
FIGS. 23A-B are diagrams of an interior permanent magnet (IPM) 2-phase motor with a stator assembly and rotor assembly.
Figure 23B:
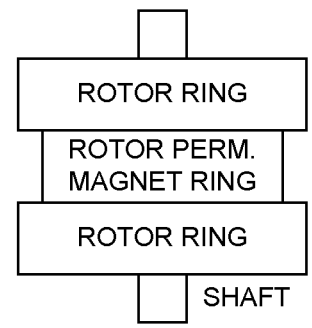

FIGS. 23A-B depict an exemplary embodiment of in interior permanent magnet (IPM) 2-phase XForm motor 2302 with a stator assembly 2304 and rotor assembly 2306. The stator assembly 2304 includes two stator rings 2308 and 2310 as the outer stator rings and a stator spacer ring 2312 as the middle stator ring. The stator rings 2308 and 2310 and the stator spacer ring 2312 each may be comprised of laminated stacks.

The rotor assembly 2306 includes two rotor rings 2314 and 2316 as the outer rotor rings, a rotor magnet ring 2318 as the middle rotor ring, and a shaft 2320. The rotor rings 2314 and 2316 each may be comprised of laminated stacks. The rotor magnet ring 2318 is an axially magnetized ring magnet or a non-magnetic ring with two or more permanent magnets all having the same polarity.

Figure 24A:
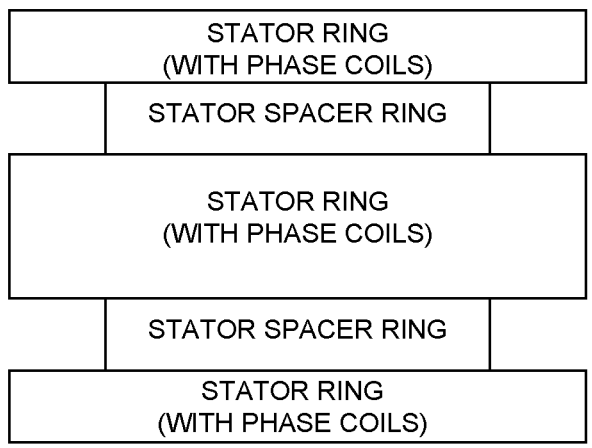
FIGS. 24A-B are diagrams of an IPM 3-phase motor with a stator assembly and rotor assembly.
Figure 24B:
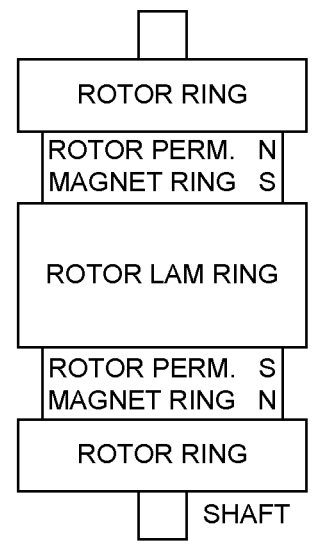

FIGS. 24A-B depict an exemplary embodiment of an IPM 3-phase XForm motor 2402 with a stator assembly 2404 and rotor assembly 2406. The stator assembly 2404 includes three stator rings 2408-2412, including two outer stator rings 2408 and 2410 and one interior stator ring 2412, and two stator spacer rings 2414 and 2416 as the middle stator rings. The stator rings 2408-2423 and the stator spacer rings 2414 and 2416 each may be comprised of laminated stacks.

The rotor assembly 2406 includes three rotor rings 2418-2422 as the rotor rings, including two outer rotor rings 2418 and 2420 and one middle rotor ring 2422, two rotor magnet rings 2424 and 2426 as the middle rotor rings, and a shaft 2426. The magnet rings 2424 both have a polarity with south facing the middle rotor ring 1422. The rotor rings 2418-2422 each may be comprised of laminated stacks. The rotor magnet rings 2424 and 2426 each are an axially magnetized ring magnet or a non-magnetic ring with two or more permanent magnets all having the same polarity.

Figure 25:
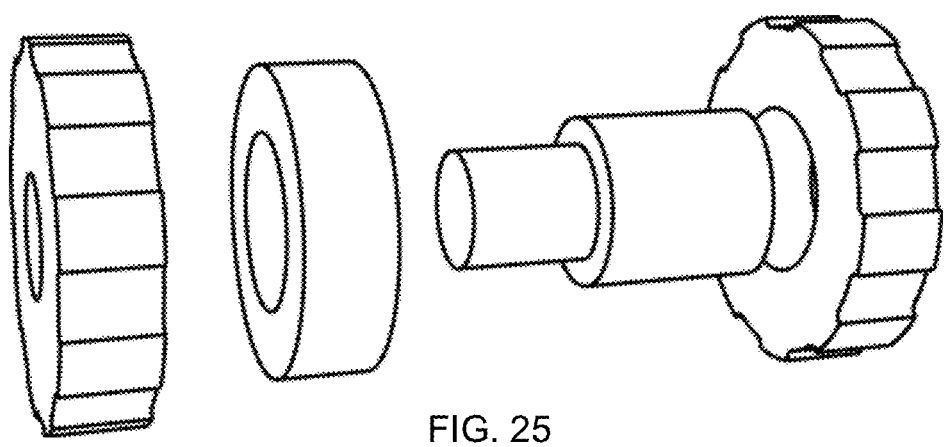
FIG. 25 is an exploded view of a rotor assembly for an IPM 2-phase motor.

FIG. 25 is an exemplary embodiment of a rotor assembly 2502 for an IPM 2-phase XForm motor. The rotor assembly 2502 includes two rotor rings 2504 and 2506 as the outer rotor rings, a rotor magnet ring 2508 as the middle rotor ring, and a shaft 2510. The rotor rings 2504 and 2506 each have poles 2512 and 2514. The rotor poles 2512 of the front rotor ring 2504 are offset from the rotor poles 2514 of the rear rotor ring 2506 by a selected offset distance 2516 with respect to a reference axis or reference point 2518 on the rotors. The rotor rings 2504 and 2506 each may be comprised of laminated stacks. The rotor spacer ring 2508 is an axially magnetized ring magnet or a non-magnetic ring with two or more permanent magnets all having the same polarity.

Figure 26:
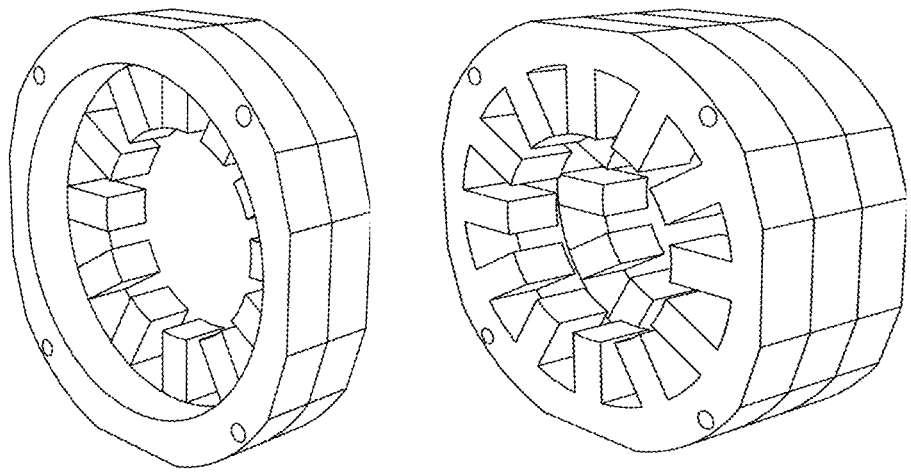
FIG. 26 is a view of a stator assembly with a stator spacer ring and without phase coils for an IPM motor.

FIG. 26 is an exemplary embodiment of a stator assembly 2602 with a stator spacer ring and without phase coils for an IPM 2-phase XForm motor. The stator assembly 2602 includes two stator rings 2604 and 2606 as the outer stator rings and a stator spacer ring 2608 as the middle stator ring. The stator rings 2604 and 2606 each have stator poles 2610 and 2612. The stator poles 2610 of the front stator ring 2604 are aligned with the stator poles 2612 of the rear stator ring 2606 along a reference axis 2614. The stator rings 2604 and 2606 and the stator spacer ring 2608 each may be comprised of laminated stacks.

Figure 27:
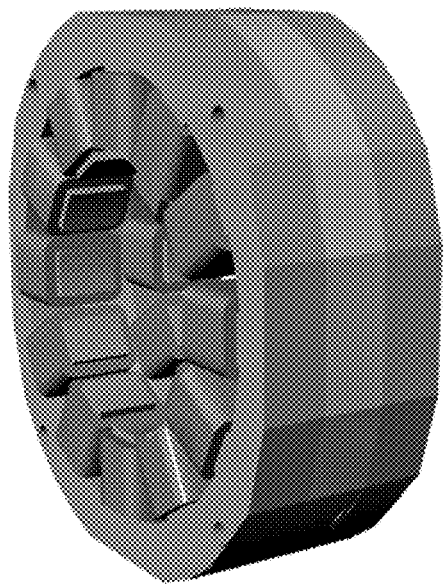
FIG. 27 is a view of a stator assembly with a stator spacer ring and with phase coils for an IPM motor.

FIG. 27 is an exemplary embodiment of a stator assembly 2702 with a stator spacer ring and with phase coils for an IPM 2-phase motor. The stator assembly 2702 of FIG. 27 includes the stator assembly 2602 of FIG. 26 with phase coils 2704 and 2706 wound about the teeth of the stator rings 2606 and 2608.

Figure 28:
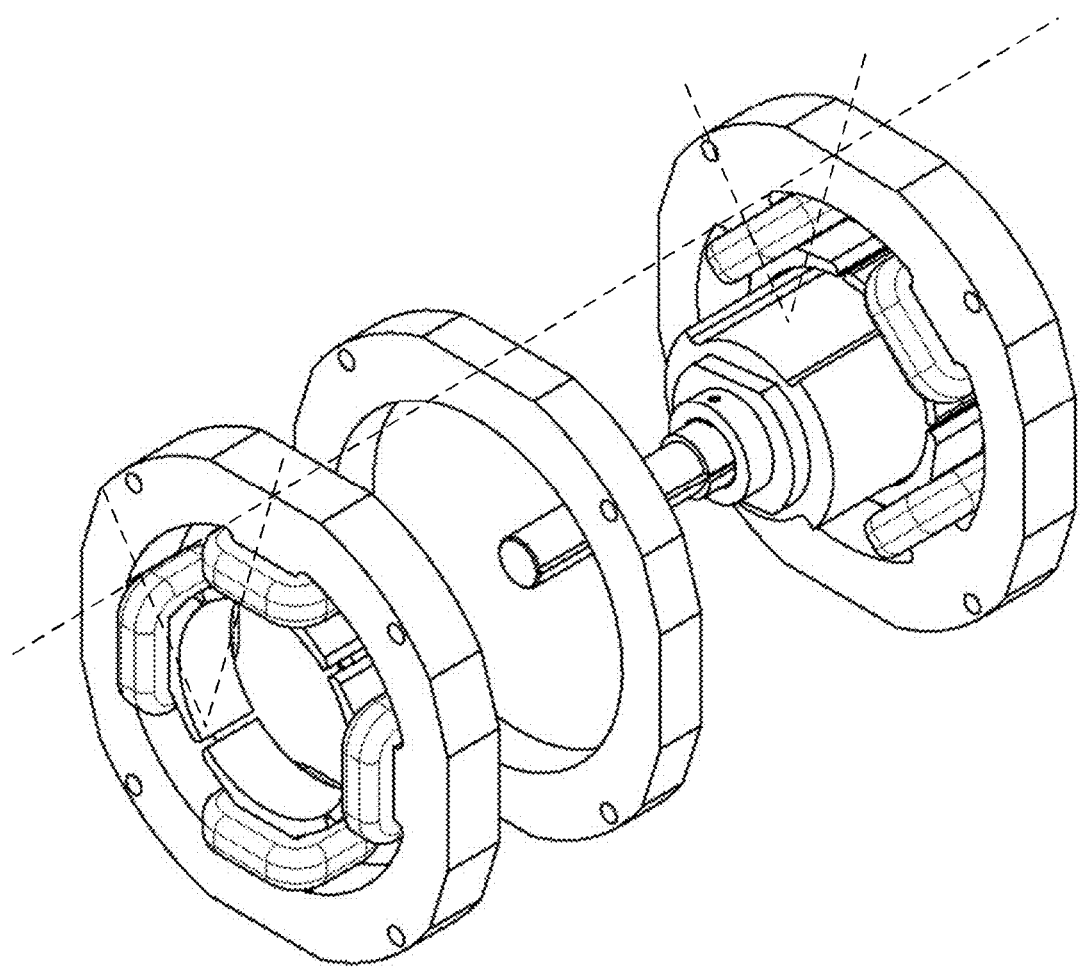
FIG. 28 is an exploded view of an SR motor with a stator assembly having 4 stator poles and offset stator phase coils and a rotor assembly having a unitary rotor and 2 rotor poles.

FIG. 28 is an exemplary embodiment of an SR XForm motor 2802 with a stator assembly having 4 offset stator poles and offset stator phase coils and a rotor assembly having a unitary rotor and 2 rotor poles. The SR XForm motor 2802 has a rotor assembly 2804 and a stator assembly 2806.

The rotor assembly 2804 includes an aligned unitary rotor ring 2808 and a shaft 2810. The rotor 2808 has 2 rotor poles 2810 and 2812 and a rotor pole pitch between the rotor poles. The rotor ring 2808 may be comprised of laminated stacks.

The stator assembly 2806 includes two stator rings 2814 and 2816 as the outer stator rings and a stator spacer ring 2818 as the middle stator ring. The stator rings 2814 and 2816 each have 4 stator poles 2818-2824 and 2826-2832 defined by stator teeth, respectively, and a stator pole pitch between the stator poles. Each stator ring 2814-2816 also has phase coils 2834 and 2836 wound about each of the teeth of the stator rings. The stator poles 2818-2824 of the front stator ring 2814 are offset from the stator poles 2826-2832 of the rear stator ring 2816 by an offset distance 2838 with respect to a reference axis or reference point 2840. Since the phase coils 2834 and 2836 are wound around the teeth of the stator ring that defines the corresponding poles, the phase coils of the front (or first) stator 2814 are likewise offset from the phase coils of the rear (or second) stator 2816 by an offset distance 2838. The stator rings 2814 and 2816 and the stator spacer ring 2818 each may be comprised of laminated stacks.

Figure 29:
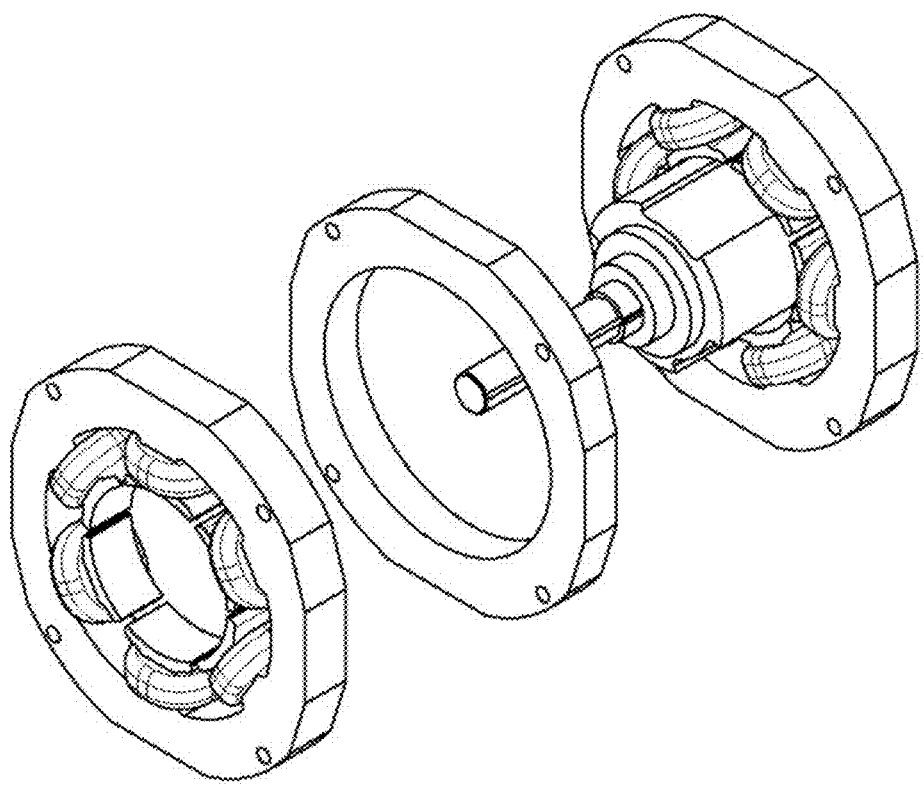
FIG. 29 is an exploded view of an SR motor with a stator assembly having 6 stator poles and offset stator phase coils and a rotor assembly having a unitary rotor and 3 rotor poles.

FIG. 29 is an exemplary embodiment of an SR XForm motor 2902 with a stator assembly having 6 offset stator poles and offset stator phase coils and a rotor assembly having a unitary rotor and 3 rotor poles. The SR XForm motor 2902 has a rotor assembly 2904 and a stator assembly 2906.

The rotor assembly 2904 includes an aligned unitary rotor ring 2908 and a shaft 2910. The rotor 2908 has 3 rotor poles 2910-2914 and a rotor pole pitch between the rotor poles. The rotor ring 2908 may be comprised of laminated stacks.

The stator assembly 2906 includes two stator rings 2916 and 2918 as the outer stator rings and a stator spacer ring 2920 as the middle stator ring. The stator rings 2916 and 2918 each have 6 stator poles 2922-2932 and 2934-2944 defined by stator teeth, respectively, and a stator pole pitch between the stator poles. Each stator ring 2916-2918 also has phase coils 2944 and 2946 wound about each of the teeth of the stator rings. The stator poles 2922-2932 of the front (or first) stator ring 2916 are offset from the stator poles 2934-2944 of the rear (or second) stator ring 2918 by an offset distance 2948 with respect to a reference axis or reference point 2950. Since the phase coils 2944 and 2946 are wound around the teeth of the stator ring that defines the corresponding poles, the phase coils of the front (or first) stator 2914 are likewise offset from the phase coils of the rear (or second) stator 2916 by an offset distance 2948. The stator rings 2916 and 2918 and the stator spacer ring 2920 each may be comprised of laminated stacks.

Figure 30:
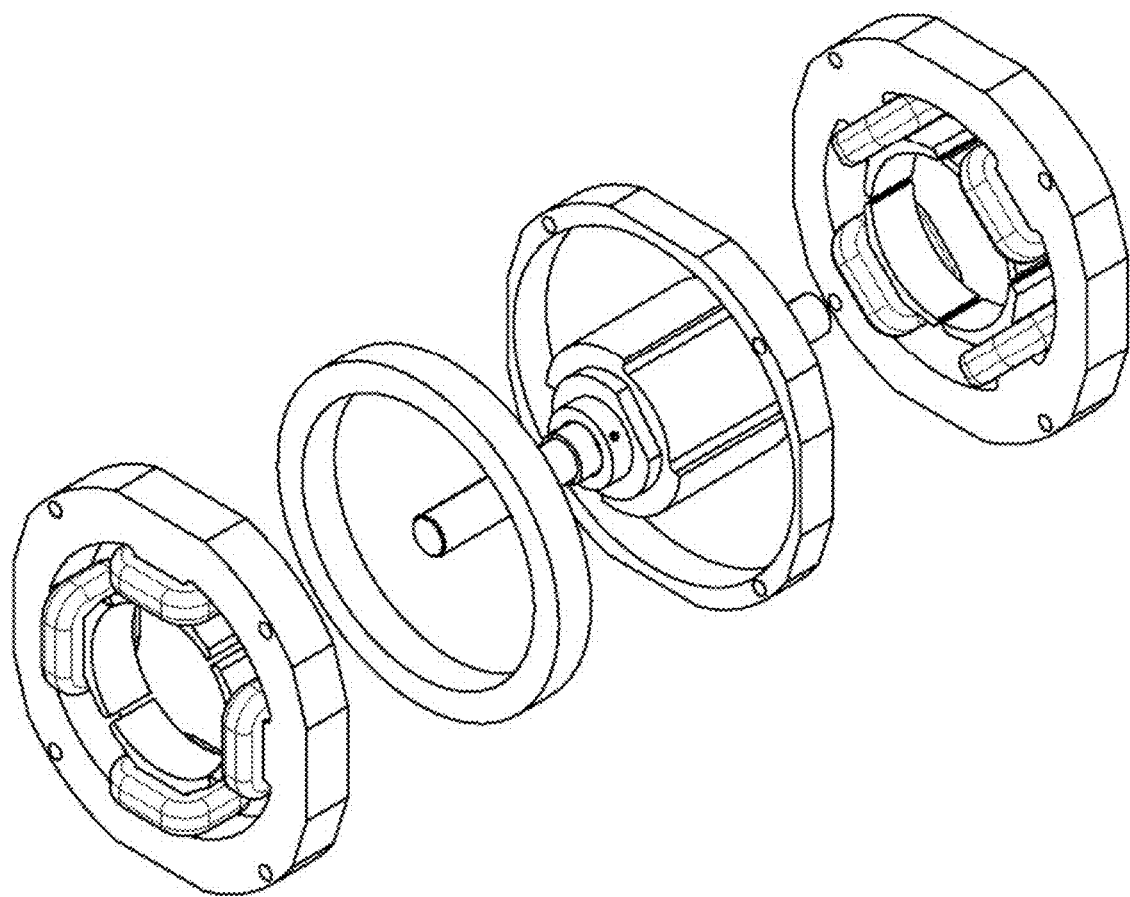
FIG. 30 is an exploded view of a PPMT motor with a stator assembly having 4 stator poles, offset stator phase coils, a magnet ring, and a retainer ring and a rotor assembly having a unitary rotor with 2 rotor poles.

FIG. 30 is an exemplary embodiment of a PPMT XForm motor 3002 with a stator assembly having 4 offset stator poles, offset stator phase coils, a magnet ring, and a retainer ring and a rotor assembly having a unitary rotor with 2 rotor poles. The PPMT XForm motor 3002 has a rotor assembly 3004 and a stator assembly 3006.

The rotor assembly 3004 includes an aligned unitary rotor ring 3008 and a shaft 3010. The rotor 3008 has 2 rotor poles 3010 and 3012 and a rotor pole pitch between the rotor poles. The rotor ring 3008 may be comprised of laminated stacks.

The stator assembly 3006 includes two stator rings 3014 and 3016 as the outer stator rings and a stator spacer retainer ring 3018 as the middle stator ring. The spacer retainer ring 3018 operates both as a stator spacer ring and as a retainer for a magnet ring 3020. The stator rings 3014 and 3016 each have 4 stator poles 3022-3028 and 3030-3036 defined by stator teeth, respectively, and a stator pole pitch between the stator poles. Each stator ring 3014-3016 also has phase coils 3038 and 3040 wound about each of the teeth of the stator rings. The stator poles 3022-3028 of the front (or first) stator ring 3014 are offset from the stator poles 3030-3036 of the rear (or second) stator ring 3016 by an offset distance 3042 with respect to a reference axis or reference point 3044. Since the phase coils 3038 and 3040 are wound around the teeth of the stator ring that defines the corresponding poles, the phase coils of the front (or first) stator 3014 are likewise offset from the phase coils of the rear (or second) stator 3016 by an offset distance 3042. The stator rings 3014 and 3016 and the stator spacer ring 3018 each may be comprised of laminated stacks. The stator magnet ring 3020 is an axially magnetized ring magnet or a non-magnetic ring with two or more permanent magnets all having the same polarity.

Figure 31:
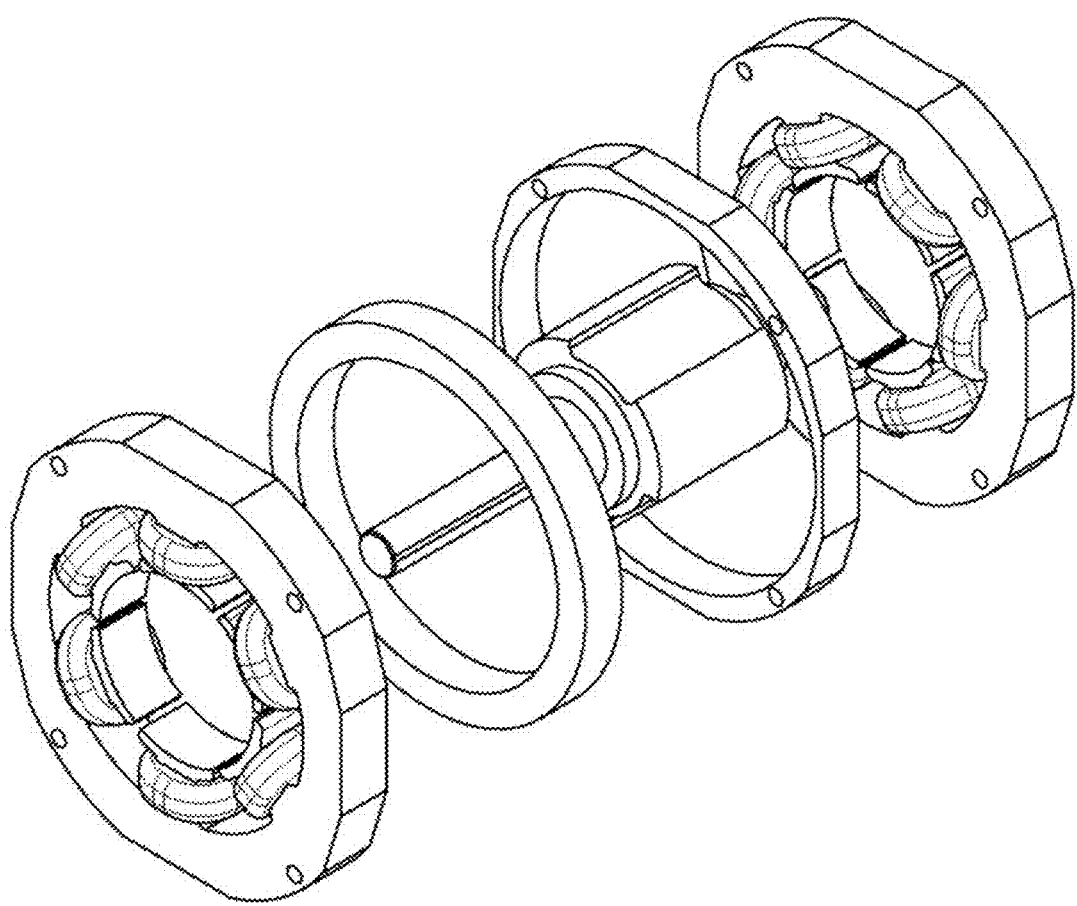
FIG. 31 is an exploded view of a PPMT motor with a stator assembly having 6 stator poles, offset stator phase coils, a magnet ring, and a retainer ring and a rotor assembly having a unitary rotor with 3 rotor poles.

FIG. 31 is an exemplary embodiment of a PPMT XForm motor 3102 with a stator assembly having 6 offset stator poles, offset stator phase coils, a magnet ring, and a retainer ring and a rotor assembly having a unitary rotor with 3 rotor poles. The PPMT XForm motor 3102 has a rotor assembly 3104 and a stator assembly 3106.

The rotor assembly 3104 includes an aligned unitary rotor ring 3108 and a shaft 3110. The rotor 3108 has 3 rotor poles 3110-3114 and a rotor pole pitch between the rotor poles. The rotor ring 3108 may be comprised of laminated stacks.

The stator assembly 3106 includes two stator rings 3116 and 3118 as the outer stator rings and a stator magnet ring 3120 with a retainer ring 3121 as the middle stator ring. The stator rings 3116 and 3118 each have 6 stator poles 3122-3132 and 3134-3144 defined by stator teeth, respectively, and a stator pole pitch between the stator poles. Each stator ring 3116-3118 also has phase coils 3144 and 3146 wound about each of the teeth of the stator rings. The stator poles 3122-3132 of the front (or first) stator ring 3116 are offset from the stator poles 3134-3144 of the rear (or second) stator ring 3118 by an offset distance 3148 with respect to a reference axis or reference point 3150. Since the phase coils 3144 and 3146 are wound around the teeth of the stator ring that defines the corresponding poles, the phase coils of the front (or first) stator 3114 are likewise offset from the phase coils of the rear (or second) stator 3116 by an offset distance 3148. The stator rings 3116 and 3118 and the retainer ring 3121 each may be comprised of laminated stacks. The stator magnet ring 3120 is an axially magnetized ring magnet or a non-magnetic ring with two or more permanent magnets all having the same polarity.

Figure 32:
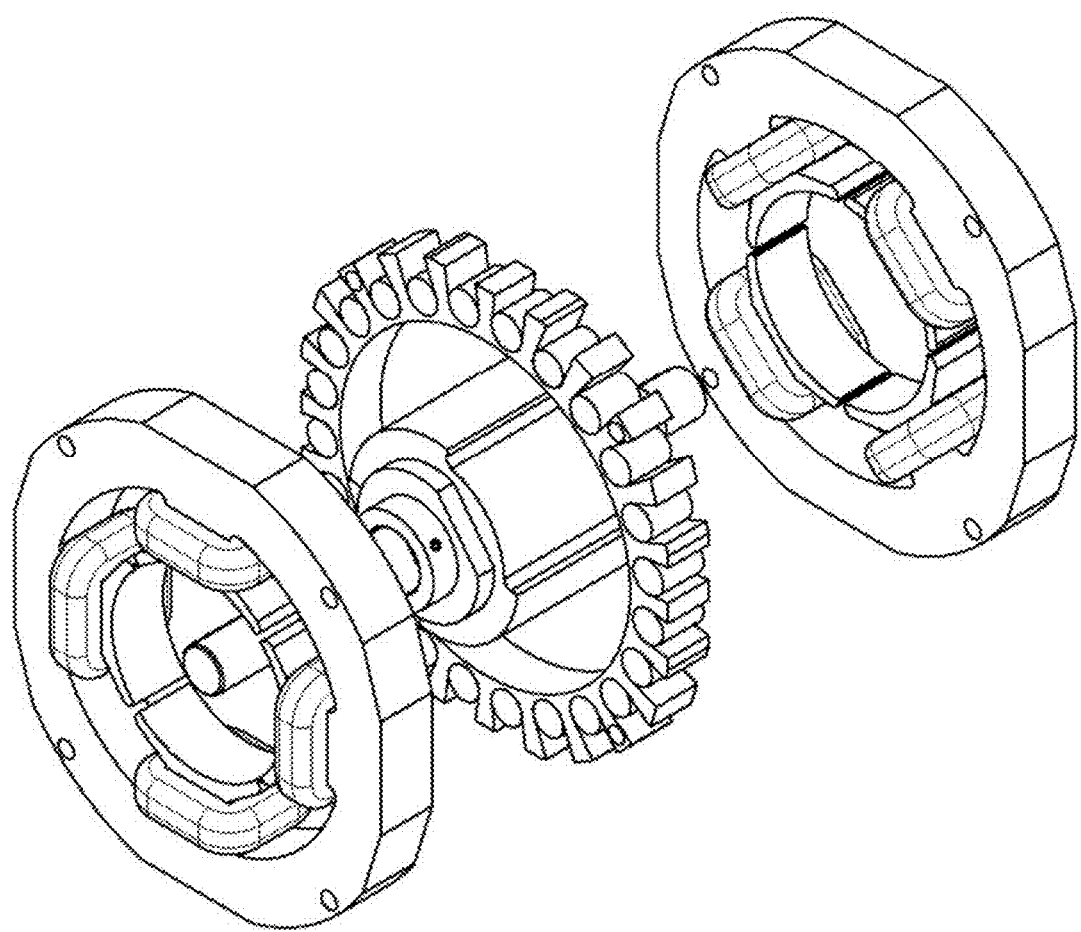
FIG. 32 is an exploded view of a PPMT motor with a stator assembly having 4 stator poles, offset stator phase coils, and a non-magnetic retainer ring with permanent magnets and a rotor assembly having a unitary rotor with 2 rotor poles.

FIG. 32 is an exemplary embodiment of a PPMT XForm motor 3202 with a stator assembly having 4 stator poles, offset stator phase coils, and a non-magnetic retainer ring with permanent magnets and a rotor assembly having a unitary rotor with 2 rotor poles. The PPMT XForm motor 3202 has a rotor assembly 3204 and a stator assembly 3206.

The rotor assembly 3204 includes an aligned unitary rotor ring 3208 and a shaft 3210. The rotor 3208 has 2 rotor poles 3210 and 3212 and a rotor pole pitch between the rotor poles. The rotor ring 3208 may be comprised of laminated stacks.

The stator assembly 3206 includes two stator rings 3214 and 3216 as the outer stator rings and a non-magnetic stator retainer ring 3218, as the middle stator ring, with permanent magnets 3220 all having the same magnetic polarity, such as all north to south or all south to north. The retainer ring 3218 operates both as a stator spacer ring and as a retainer for the permanent magnets 3220. The stator rings 3214 and 3216 each have 4 stator poles 3222-3228 and 3232-3236 defined by stator teeth, respectively, and a stator pole pitch between the stator poles. Each stator ring 3214-3216 also has phase coils 3238 and 3240 wound about each of the teeth of the stator rings. The stator poles 3222-3228 of the front (or first) stator ring 3214 are offset from the stator poles 3232-3236 of the rear (or second) stator ring 3216 by an offset distance 3242 with respect to a reference axis or reference point 3244. Since the phase coils 3238 and 3240 are wound around the teeth of the stator ring that defines the corresponding poles, the phase coils of the front (or first) stator 3214 are likewise offset from the phase coils of the rear (or second) stator 3216 by an offset distance 3242. The stator rings 3214 and 3216 and the stator spacer ring 3218 each may be comprised of laminated stacks.

Figure 33:
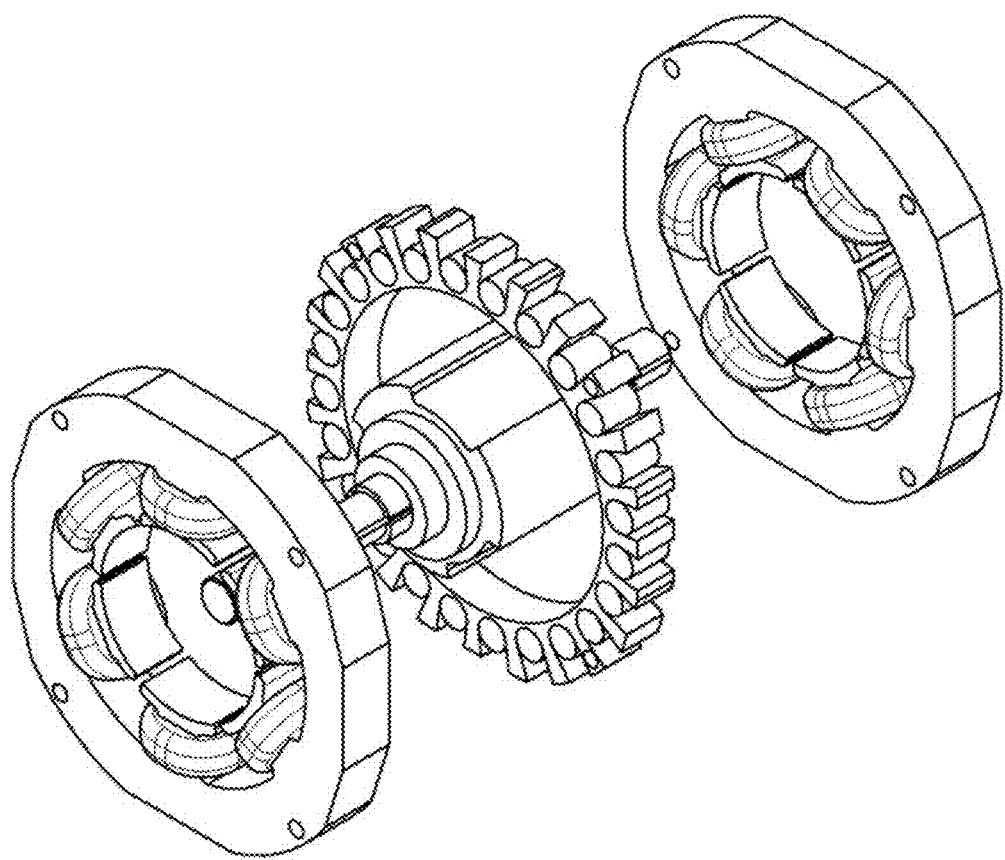
FIG. 33 is an exploded view of a PPMT motor with a stator assembly having 6 stator poles, offset stator phase coils, and a non-magnetic retainer ring with permanent magnets and a rotor assembly having a unitary rotor with 3 rotor poles.

FIG. 33 is an exemplary embodiment of a PPMT XForm motor with a stator assembly having 6 offset stator poles, offset stator phase coils, and a non-magnetic retainer ring with permanent magnets and a rotor assembly having a unitary rotor with 3 rotor poles. The PPMT XForm motor 3302 has a rotor assembly 3304 and a stator assembly 3306.

The rotor assembly 3304 includes an aligned unitary rotor ring 3308 and a shaft 3310. The rotor 3308 has 3 rotor poles 3310-3314 and a rotor pole pitch between the rotor poles. The rotor ring 3308 may be comprised of laminated stacks.

The stator assembly 3306 includes two stator rings 3316 and 3318 as the outer stator rings and a non-magnetic stator retainer ring 3220, as the middle stator ring, with permanent magnets 3222 all having the same magnetic polarity, such as all north to south or all south to north. The stator rings 3316 and 3318 each have 6 stator poles 3324-3334 and 3336-3346 defined by stator teeth, respectively, and a stator pole pitch between the stator poles. Each stator ring 3316-3318 also has phase coils 3348 and 3350 wound about each of the teeth of the stator rings. The stator poles 3324-3334 of the front (or first) stator ring 3316 are offset from the stator poles 3336-3346 of the rear (or second) stator ring 3318 by an offset distance 3352 with respect to a reference axis or reference point 3354. Since the phase coils 3348 and 3350 are wound around the teeth of the stator ring that defines the corresponding poles, the phase coils of the front (or first) stator 3314 are likewise offset from the phase coils of the rear (or second) stator 3316 by an offset distance 3352. The stator rings 3316 and 3318 each may be comprised of laminated stacks.

Figure 34:
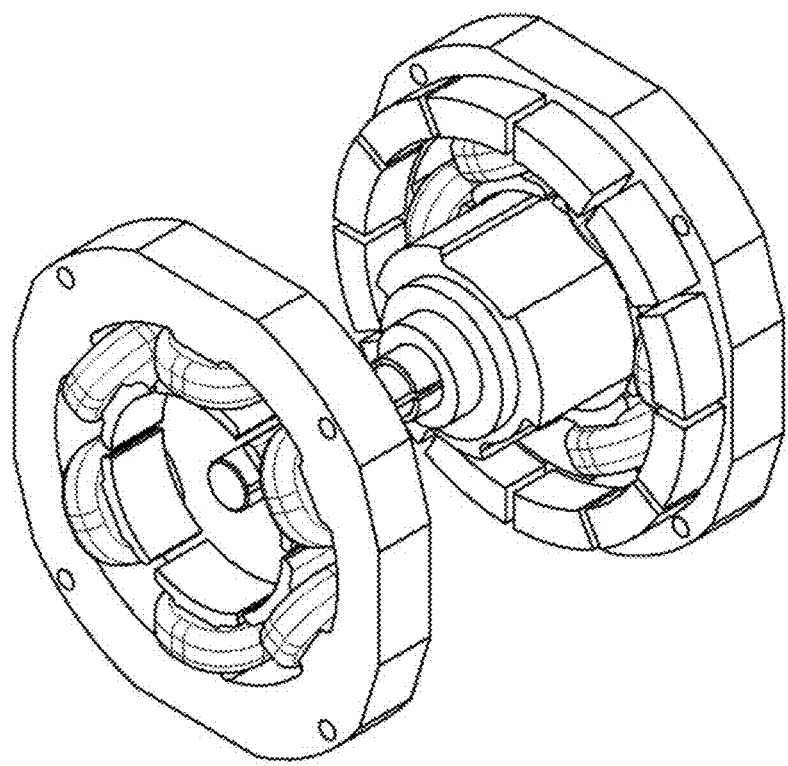
FIG. 34 is an exploded view of a PPMT motor with a stator assembly having 6 stator poles, offset stator phase coils, and permanent magnets and a rotor assembly having a unitary rotor with 3 rotor poles.

FIG. 34 is an exemplary embodiment of a PPMT XForm motor 3402 with a stator assembly having 6 offset stator poles, offset stator phase coils, and permanent magnets and a rotor assembly having a unitary rotor with 3 rotor poles. The PPMT XForm motor 3402 of FIG. 34 is similar to the PPMT XForm motor 3302 of FIG. 33. Except, the XForm motor 3402 of FIG. 34 replaces the non-magnetic stator retainer ring 3220 and permanent magnets 3222 in the stator assembly 3306 with permanent magnets 3404 mounted to one of the stator rings 3316 or 3318. In the example of FIG. 34, the permanent magnets 3404 are glued or otherwise bonded to the rear (or second) stator ring 3318.

Figure 35:
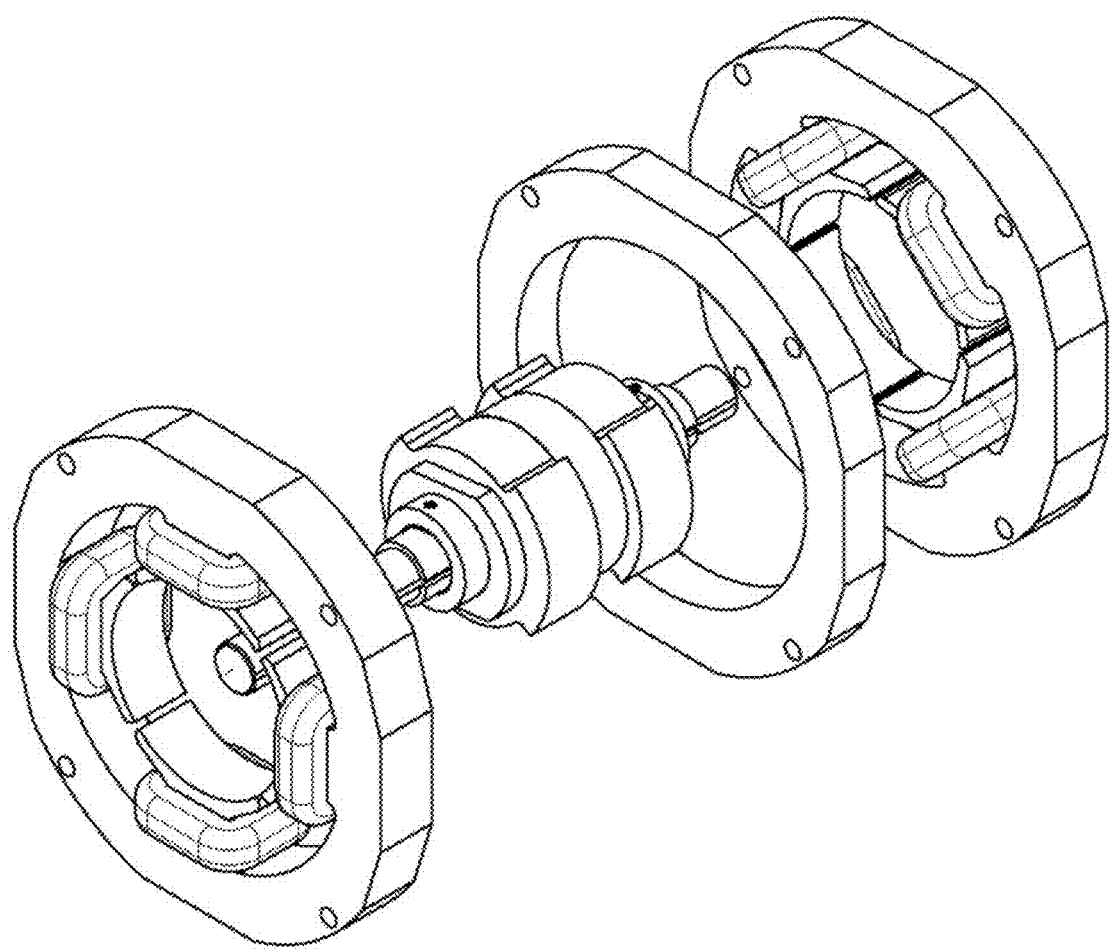
FIG. 35 is an exploded view of an IPM motor with a stator assembly having 4 stator poles and offset stator phase coils and a rotor assembly having 2 rotor poles, a split rotor, and a magnet ring.

FIG. 35 is an exemplary embodiment of an IPM XForm motor 3502 with a stator assembly having 4 stator poles and offset stator phase coils and a rotor assembly having 2 rotor poles, a split rotor, and a magnet ring. The IPM XForm motor 3502 has a rotor assembly 3504 and a stator assembly 3506.

The rotor assembly 3504 includes a split aligned rotor 3508 and a shaft 3510. The split aligned rotor 3508 includes rotor rings 3512 and 3514 as the outer rotor rings and a magnet ring 3516 as the middle rotor ring. The rotor rings 3512 and 3514 each have 2 rotor poles 3516 and 3518. The rotor poles 3516 of the front (or first) rotor ring 3512 are offset from the rotor poles 3518 of the rear (or second) rotor ring 3514 by a selected offset distance 3516 with respect to a reference axis or reference point 3518 on the rotors. The rotor rings 3512 and 3514 each may be comprised of laminated stacks. The rotor magnet ring 3516 is an axially magnetized ring magnet or a non-magnetic ring with two or more permanent magnets all having the same polarity.

The stator assembly 3506 includes two stator rings 3520 and 3522 as the outer stator rings and a spacer ring 3524 as the middle stator ring. The stator rings 3520 and 3522 each have 4 stator poles 3524-3530 and 3532-3538 defined by stator teeth, respectively, and a stator pole pitch between the stator poles. Each stator ring 3520 and 3522 also has phase coils 3540 and 3542 wound about each of the teeth of the stator rings. The stator poles 3524-3530 of the front (or first) stator ring 3520 are offset from the stator poles 3532-3538 of the rear (or second) stator ring 3522 by an offset distance 3544 with respect to a reference axis or reference point 3546. Since the phase coils 3540 and 3542 are wound around the teeth of the stator ring that defines the corresponding poles, the phase coils of the front (or first) stator 3520 are likewise offset from the phase coils of the rear (or second) stator 3522 by an offset distance 3544. The stator rings 3520 and 3522 and the stator spacer ring 3524 each may be comprised of laminated stacks.

Figure 36:
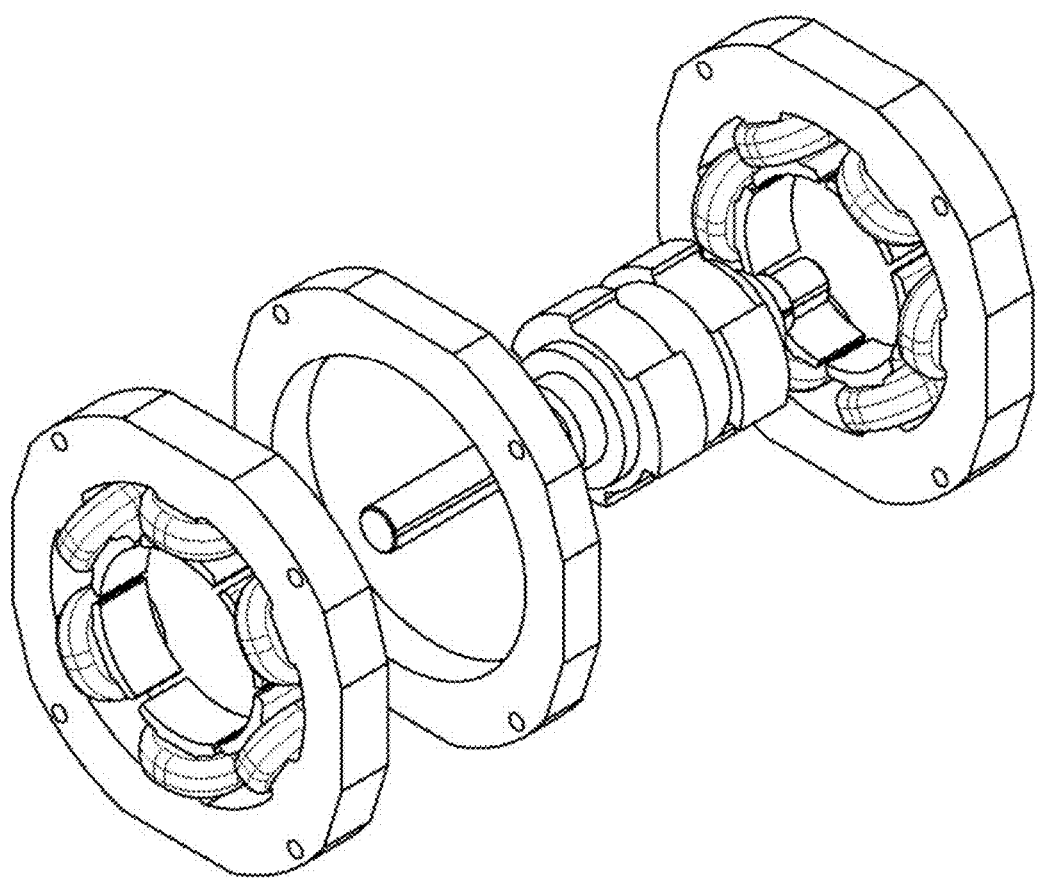
FIG. 36 is an exploded view of an IPM motor with a stator assembly having 6 stator poles and offset stator phase coils and a rotor assembly having 3 rotor poles, a split rotor, and a magnet ring.

FIG. 36 is an exemplary embodiment of an IPM XForm motor 3602 with a stator assembly having 6 stator poles and offset stator phase coils and a rotor assembly having 3 rotor poles, a split rotor, and a magnet ring. The IPM XForm motor 3602 of FIG. 36 is similar to the IPM XForm motor 3602 of FIG. 36 except the IPM XForm motor of FIG. 36 has 6 stator poles and 3 rotor poles instead of 4 stator poles and 2 rotor poles in FIG. 36. The IPM XForm motor 3602 has a rotor assembly 3604 and a stator assembly 3606.

The rotor assembly 3604 includes a split aligned rotor 3608 and a shaft 3610. The split aligned rotor 3608 includes rotor rings 3612 and 3614 as the outer rotor rings and a magnet ring 3616 as the middle rotor ring. The rotor rings 3610 and 3612 each have 3 rotor poles 3618-3622 and 3624-3630, respectively, and a rotor pole pitch between the rotor poles. The rotor poles 3618-3622 of the front (or first) rotor ring 3612 are aligned with the rotor poles 3624-3630 of the rear (or second) rotor ring 3614 along a reference axis or reference point 3632 on the rotors. The rotor rings 3612 and 3614 each may be comprised of laminated stacks. The rotor magnet ring 3614 is an axially magnetized ring magnet or a non-magnetic ring with two or more permanent magnets all having the same polarity.

The stator assembly 3606 includes two stator rings 3634 and 3636 as the outer stator rings and a spacer ring 3638 as the middle stator ring. The stator rings 3634 and 3636 each have 6 stator poles 3638-3648 and 3650-3660 defined by stator teeth, respectively, and a stator pole pitch between the stator poles. Each stator ring 3634 and 3636 also has phase coils 3662 and 3664 wound about each of the teeth of the stator rings. The stator poles 3638-3648 of the front (or first) stator ring 3634 are offset from the stator poles 3650-3660 of the rear (or second) stator ring 3636 by an offset distance 3666 with respect to a reference axis or reference point 3668. Since the phase coils 3662 and 3664 are wound around the teeth of the stator ring that defines the corresponding poles, the phase coils of the front (or first) stator 3634 are likewise offset from the phase coils of the rear (or second) stator 3636 by an offset distance 3666. The stator rings 3634 and 3636 and the stator spacer ring 3638 each may be comprised of laminated stacks.

Figure 37:
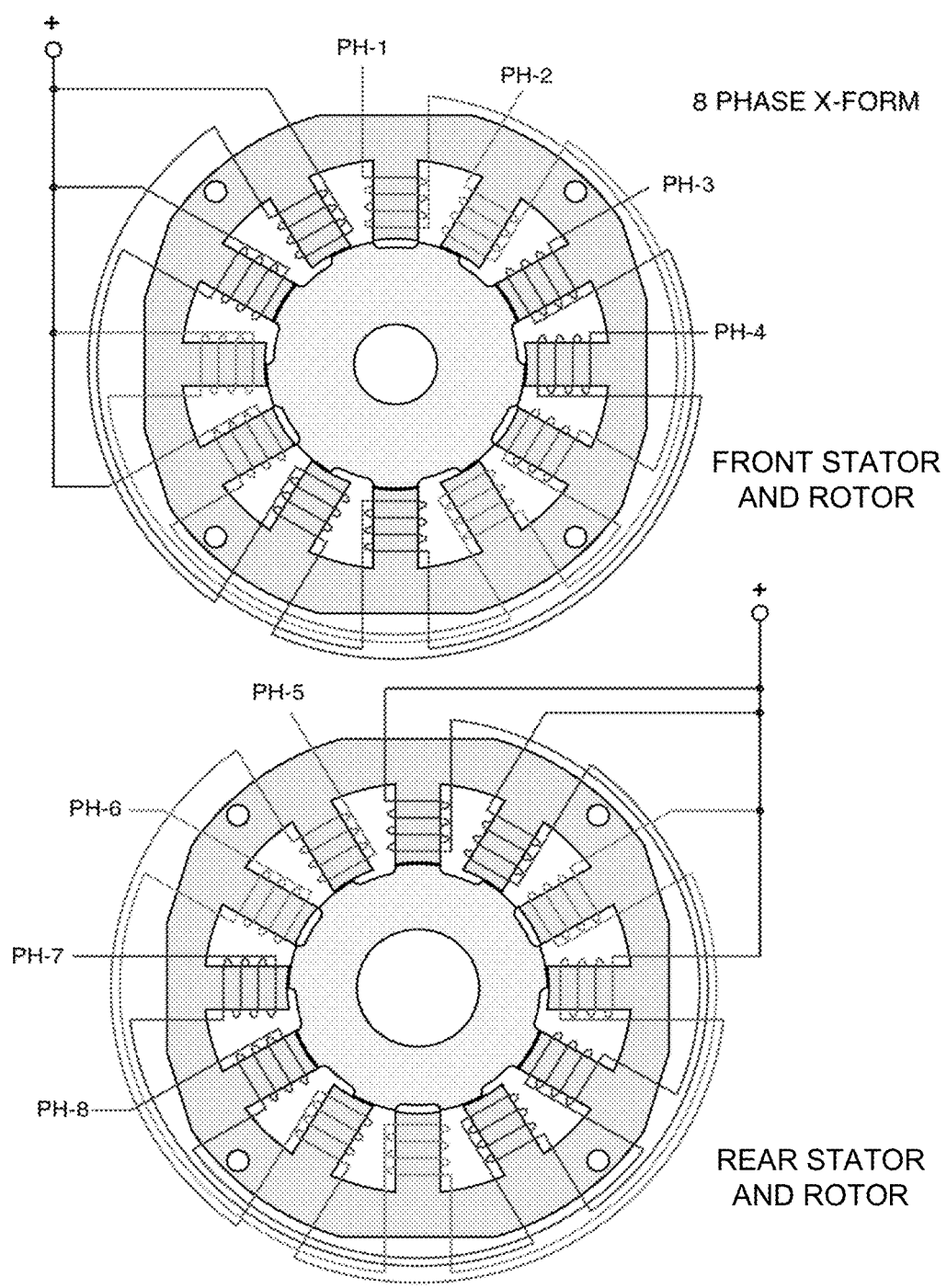
FIG. 37 is a wiring diagram of an 8 phase SR motor and an 8 phase PPMT motor having 12 stator poles and 9 rotor poles.

FIG. 37 is an exemplary embodiment of a wiring diagram of an 8 phase SR XForm motor and an 8 phase XForm PPMT motor having 12 stator poles and 9 rotor poles.

Figure 38:
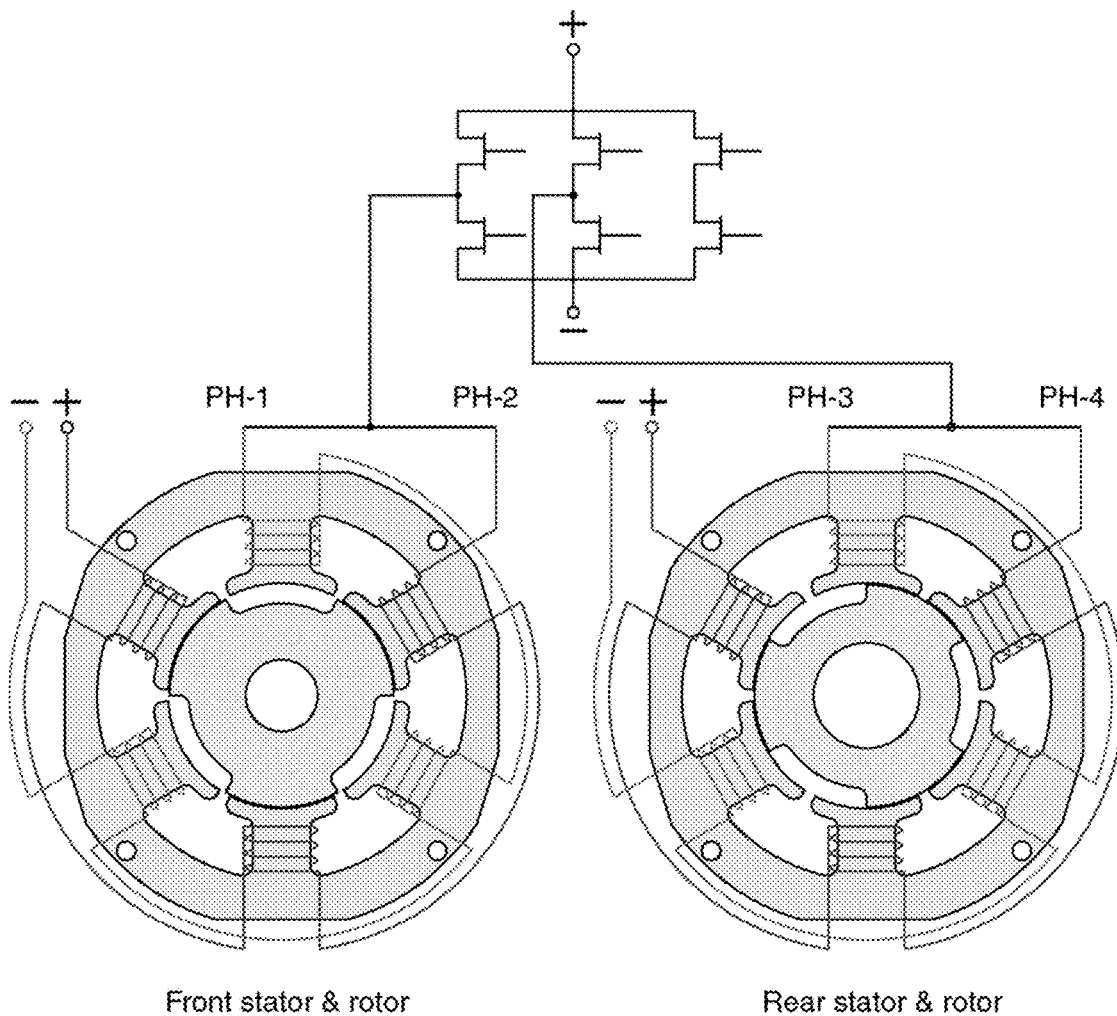
FIG. 38 is a wiring diagram of phase sequences for an XForm motor having 6 stator poles and 3 rotor poles.
Figure 38:
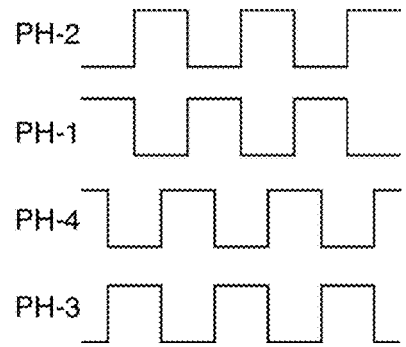
Figure 38:
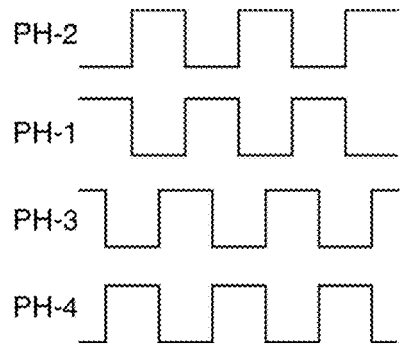

FIG. 38 is an exemplary embodiment of a wiring diagram of phase sequences for an XForm motor having 6 stator poles and 3 rotor poles.

Combinations and sub-combinations of the above processes, systems, assemblies, motors, and machines may be made.

Those skilled in the art will appreciate that variations from the specific embodiments disclosed above are contemplated by the invention. The invention should not be restricted to the above embodiments, but should be measured by the following claims.

What is claimed is:

1. A manufacturing process comprising:
    selecting two exchangeable stator components from a stator component group consisting of a stator spacer ring and an axially magnetized stator magnet ring to be a first input with three stator rings to manufacture a motor having a motor class, the exchangeable stator components being a same type of stator component from the stator component group and exchangeable for different exchangeable stator components from the stator component group to manufacture another motor having a different motor class, the different exchangeable stator components being a different same type of stator component from the stator component group;
    selecting two exchangeable rotor components from a rotor component group consisting of a rotor spacer ring and an axially magnetized rotor magnet ring to be a second input with three rotor rings to manufacture the motor having the motor class, the exchangeable rotor components being a same type of rotor component from the rotor component group and exchangeable for different exchangeable rotor components from the rotor component group to manufacture another motor having another different motor class, the different exchangeable rotor components being a different same type of rotor component from the rotor component group; and
    manufacturing the motor having the motor class with the at least two stator rings, the at least two rotor rings, the first input, and the second input.

2. The manufacturing process of claim 1 further comprising:
    exchanging the exchangeable stator components for the different exchangeable stator components as a third input or exchanging the exchangeable rotor components for the different exchangeable rotor components as the third input, a fourth input being the exchangeable stator components that were not exchanged for the different exchangeable stator components or the exchangeable rotor components that were not exchanged for the different exchangeable rotor components; and
    manufacturing the different motor having the different motor class with the three stator rings, the three rotor rings, the third input, and the fourth input.

3. The manufacturing process of claim 2 further comprising:
    using manufacturing equipment to manufacture the motor having the motor class with the three stator rings, the three rotor rings, the first input, and the second input;
    using the manufacturing equipment to also manufacture the different motor having the different motor class with the three stator rings, the three rotor rings, the third input, and the fourth input.

4. The manufacturing process of claim 1 wherein each of the three stator rings comprises teeth defining a plurality of stator poles and each of the three rotor rings comprises a plurality of rotor poles, the method further comprising providing each of the three stator rings with phase coils wound around the teeth.

5. The manufacturing process of claim 1 further comprising:
    providing poles of at least one of the three stator rings offset by an offset distance in relation to poles of at least one other of the three stator rings; and
    providing poles of at least one of the three rotor rings aligned with poles of at least one other of the three rotor rings.

6. The manufacturing process of claim 1 further comprising:
    providing poles of at least one of the three rotor rings offset by an offset distance in relation to poles of at least one other of the three rotor rings; and
    providing poles of at least one of the three stator rings aligned with poles of at least one other of the three stator rings.

7. The manufacturing process of claim 1 further comprising selecting the stator spacer ring as the exchangeable stator components and selecting the rotor spacer ring as the exchangeable rotor components to manufacture a switched reluctance motor class.

8. The manufacturing process of claim 1 further comprising selecting the axially magnetized stator magnet ring as the exchangeable stator components and selecting the rotor spacer ring as the exchangeable rotor components to manufacture a stator permanent magnet motor class.

9. The manufacturing process of claim 8 further comprising selecting each axially magnetized stator magnet ring as a non-magnetic ring with a plurality of permanent magnets all having a same polarity.

10. The manufacturing process of claim 1 further comprising selecting the stator spacer ring as the exchangeable stator components and selecting the axially magnetized rotor magnet ring as the exchangeable rotor components to manufacture a rotor permanent magnet motor class.

11. A motor comprising:
three stator rings;
a first input comprising two exchangeable stator components selected from a stator component group consisting of a stator spacer ring and an axially magnetized stator magnet ring, the two exchangeable stator components being a same stator component type from the stator component group;
three rotor rings; and
a second input comprising two exchangeable rotor components selected from a rotor component group consisting of a rotor spacer ring and an axially magnetized rotor magnet ring, the two exchangeable rotor components being a same rotor component type from the rotor component group;
the first input and the second input determining a motor class for the motor, the exchangeable stator components being exchangeable for different exchangeable stator components from the stator component group to manufacture another motor having a different motor class, the exchangeable rotor components being exchangeable for different exchangeable rotor components from the rotor component group to manufacture another motor having another different motor class, the different exchangeable stator components being a different same type of stator component from the stator component group, the different exchangeable rotor components being a different same type of rotor component from the rotor component group.

12. The motor of claim 11 further comprising:
a third input comprising the different exchangeable stator components or the different exchangeable rotor components; and
a fourth input comprising the exchangeable stator components that were not exchanged for the different exchangeable stator components or the exchangeable rotor components that were not exchanged for the different exchangeable rotor component;
wherein the different motor has the different motor class with the three stator rings, the three rotor rings, the third input, and the fourth input.

13. The motor of claim 12 further comprising manufacturing equipment to manufacture the motor having the motor class with the three stator rings, the three rotor rings, the first input, and the second input and to manufacture the different motor having the different motor class with the three stator rings, the three rotor rings, the third input, and the fourth input.

14. The motor of claim 11 wherein each of the three stator rings comprises teeth defining a plurality of stator poles with phase coils wound around the teeth and each of the three rotor rings comprises a plurality of rotor poles.

15. The motor of claim 11 wherein:
poles of at least one of the three stator rings are offset by an offset distance in relation to poles of at least one other of the at least two stator rings; and
poles of at least one of the three rotor rings are aligned with poles of at least one other of the three rotor rings.

16. The motor of claim 11 wherein:
poles of at least one of the three rotor rings are offset by an offset distance in relation to poles of at least one other of the three rotor rings; and
poles of at least one of the three stator rings are aligned with poles of at least one other of the three stator rings.

17. The motor of claim 11 wherein the exchangeable stator components each comprise the stator spacer ring and the exchangeable rotor components each comprise the rotor spacer ring to form a switched reluctance motor class.

18. The motor of claim 11 wherein the exchangeable stator components each comprise the axially magnetized stator magnet ring and the exchangeable rotor components each comprise the rotor spacer ring to form a stator permanent magnet motor class.

19. The motor of claim 18 wherein the axially magnetized stator magnet rings each comprise a non-magnetic ring with a plurality of permanent magnets all having a same polarity.

20. The motor of claim 11 wherein the exchangeable stator components each comprise the stator spacer ring and the exchangeable rotor components each comprise the axially magnetized rotor magnet ring to form a rotor permanent magnet motor class.

* * * * *